United States Patent
Seyed

(10) Patent No.: US 11,601,166 B2
(45) Date of Patent: Mar. 7, 2023

(54) ANTENNA SWITCHING ON MIMO DEVICES

(71) Applicant: Magic Leap, Inc., Plantation, FL (US)

(72) Inventor: Shurhabeel Zamir Seyed, Coral Springs, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/037,571

(22) Filed: Sep. 29, 2020

(65) Prior Publication Data
US 2021/0099205 A1    Apr. 1, 2021

Related U.S. Application Data

(60) Provisional application No. 62/908,313, filed on Sep. 30, 2019.

(51) Int. Cl.
| H04B 7/0413 | (2017.01) |
| H04L 5/14 | (2006.01) |
| H04B 7/08 | (2006.01) |
| H04B 7/06 | (2006.01) |

(52) U.S. Cl.
CPC ......... *H04B 7/0413* (2013.01); *H04B 7/0602* (2013.01); *H04B 7/0805* (2013.01); *H04L 5/14* (2013.01)

(58) Field of Classification Search
CPC .. H04B 7/0413; H04B 7/0602; H04B 7/0805; H04L 5/14
See application file for complete search history.

(56) References Cited

U.S. PATENT DOCUMENTS

| 2009/0180466 A1 | 7/2009 | Soul et al. |
| 2010/0283707 A1 | 11/2010 | Foo |
| 2011/0201368 A1 | 8/2011 | Faccin et al. |
| 2013/0315170 A1 | 11/2013 | Dawid et al. |
| 2013/0336415 A1 | 12/2013 | Hung |
| 2014/0233526 A1 | 8/2014 | Molinero |
| 2014/0293841 A1 | 10/2014 | Rousu |

(Continued)

FOREIGN PATENT DOCUMENTS

| CN | 109039345 A | 12/2018 |
| EP | 2720378 A1 | 4/2014 |

(Continued)

OTHER PUBLICATIONS

Cetiner et al., "Multifunctional Reconfigurable MEMS Integrated Antennas for Adaptive MIMO Systems", IEEE Communications Magazine, vol. 42, No. 12, Available Online at http://newport.eecs.uci.edu/rfmems/projects/publications/papers/mems/J023.pdf, Dec. 20, 2004, 13 pages.

(Continued)

*Primary Examiner* — David B Lugo
(74) *Attorney, Agent, or Firm* — Kilpatrick Townsend & Stockton LLP

(57) ABSTRACT

A multiple-input, multiple-output (MIMO) transceiver comprises a plurality of RF chains, a plurality of antennas, a plurality of switching components, and control circuitry operatively coupled to the plurality of switching components. In some examples, a total quantity of RF chains included in the plurality of RF chains is equal to a first value, and a total quantity of antennas included in the plurality of antennas is equal to a second value that is less than the first value.

15 Claims, 21 Drawing Sheets

(56) References Cited

U.S. PATENT DOCUMENTS

| | | | |
|---|---|---|---|
| 2015/0036760 A1 | 2/2015 | Pang et al. | |
| 2015/0085708 A1 | 3/2015 | Khlat | |
| 2016/0191227 A1* | 6/2016 | Pagano | H04B 1/40 370/281 |
| 2016/0276748 A1* | 9/2016 | Ramachandran | H01Q 21/28 |
| 2018/0019768 A1* | 1/2018 | King | H04L 27/0002 |
| 2018/0317070 A1 | 11/2018 | Li et al. | |
| 2019/0097715 A1* | 3/2019 | Maldonado | H04B 7/0811 |
| 2021/0226672 A1* | 7/2021 | Cho | H04B 1/0064 |

FOREIGN PATENT DOCUMENTS

| | | |
|---|---|---|
| EP | 3540966 A1 | 9/2019 |
| EP | 3540968 A1 | 9/2019 |
| WO | 2021067309 A1 | 4/2021 |

OTHER PUBLICATIONS

Application No. PCT/US2020/053334, International Search Report and Written Opinion, dated Jan. 5, 2021, 11 pages.
Application No. PCT/US2020/053334, International Preliminary Report on Patentability, dated Apr. 14, 2022, 9 pages.
Application No. EP20871022.8, "Extended European Search Report", dated Oct. 24, 2022, 8 pages.

* cited by examiner

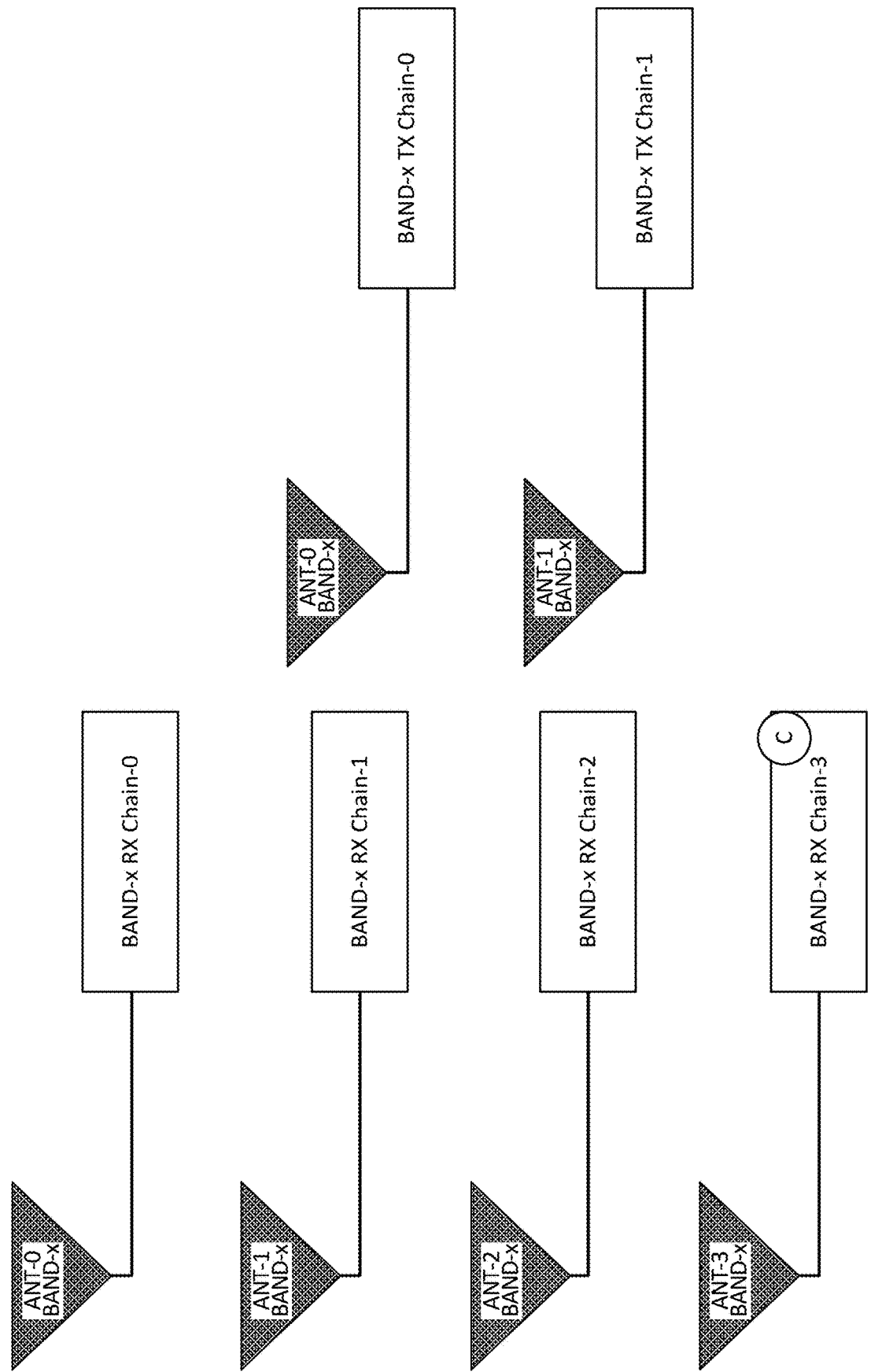

| | RX slot | TX slot | RX slot | TX slot | RX slot | | RX slot | |
|---|---|---|---|---|---|---|---|---|
| ANT-4 | n79 RX3 / n78 RX3 | | n79 RX3 / n78 RX3 | | n79 RX3 / n78 RX1 | n78 TX1 | n79 RX3 / n78 RX1 | n78 TX1 |
| ANT-5 | n79 RX1 | | n79 RX1 | | n79 RX1 | | n79 RX1 | |
| ANT-3 | n78 RX1 | n78 TX1 | n78 RX1 | n78 TX1 | n78 RX3 | | n78 RX3 | |
| ANT-2 | n79 RX2 / n78 RX2 | | n79 RX2 / n78 RX2 | | n79 RX2 / n78 RX0 | n78 TX0 | n79 RX2 / n78 RX0 | n78 TX0 |
| ANT-1 | n79 RX0 | | n79 RX0 | | n79 RX0 | | n79 RX0 | |
| ANT-0 | n78 RX0 | n78 TX0 | n78 RX0 | n78 TX0 | n78 RX2 | | n78 RX2 | |
| | SWITCH State-A | | | | SWITCH State-B | | | |

FIG. 7D

| | RX slot | TX slot | RX slot | TX slot | RX slot | | RX slot | |
|---|---|---|---|---|---|---|---|---|
| ANT-4 | n79 RX3 / n78 RX3 | | n79 RX3 / n78 RX3 | | n79 RX1 / n78 RX1 | n78 TX1 | n79 RX3 / n78 RX1 | n78 TX1 |
| ANT-5 | n78 RX1 | n79 TX1 | n79 RX1 | n79 TX1 | n79 RX3 | | n79 RX3 | |
| ANT-3 | n78 RX1 | | n78 RX1 | | n78 RX3 | | n78 RX3 | |
| ANT-2 | n79 RX2 / n78 RX2 | | n79 RX2 / n78 RX2 | | n79 RX0 / n78 RX0 | n79 TX0 | n79 RX0 / n78 RX0 | n79 TX0 |
| ANT-1 | n79 RX0 | n79 TX0 | n79 RX0 | n79 TX0 | n79 RX2 | | n79 RX2 | |
| ANT-0 | n78 RX0 | | n78 RX0 | | n78 RX2 | | n78 RX2 | |
| | SWITCH State-A | | | | SWITCH State-B | | | |

FIG. 7E

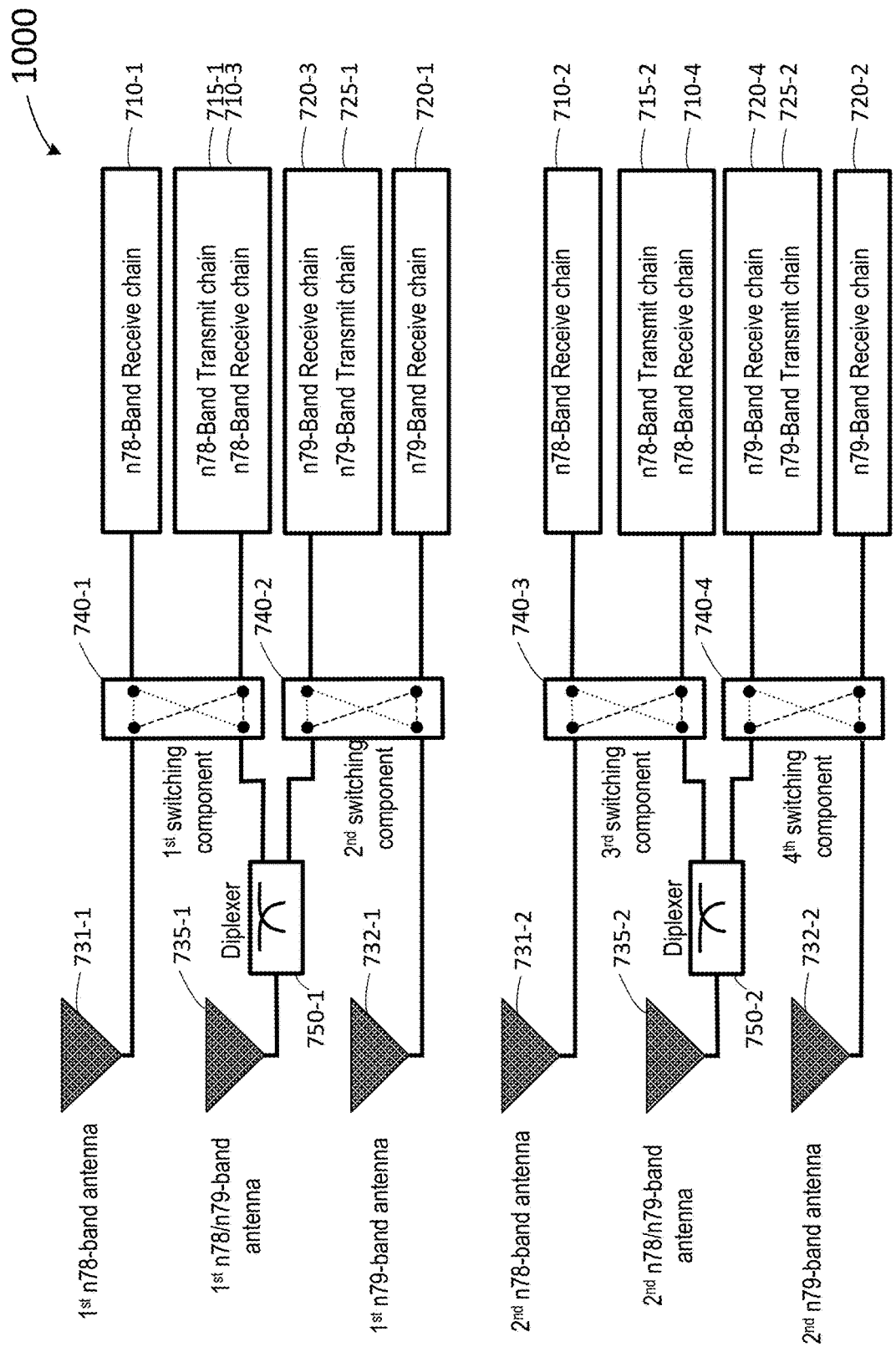

ANTENNA SWITCHING ON MIMO DEVICES

CROSS-REFERENCES TO RELATED APPLICATIONS

This application claims priority to U.S. Provisional Patent Application No. 62/908,313, filed on Sep. 30, 2019, entitled "ANTENNA SWITCHING ON DEVICES," the disclosure of which is hereby incorporated by reference in its entirety for all purposes.

BACKGROUND OF THE INVENTION

Multiple-input multiple-output (MIMO) systems have received significant attention by increasing the capacity and spectral efficiency through spatial multiplexing. MIMO or large scaled antenna systems having a large number of antenna elements at the base station have been deployed in recent years.

Despite the progress made in MIMO systems, there is a need in the art for improved methods and systems related to MIMO systems.

SUMMARY OF THE INVENTION

The present invention relates in general to the field of wireless communication, and more specifically, to devices and methods for a multiple-input multiple-output (MIMO) communication device. Embodiments of the present invention provide circuits and methods for efficient use of antennas in a MIMO system that includes antenna switching and carrier aggregation.

In some embodiments, a multiple-input, multiple-output (MIMO) transceiver in a communication device can include a plurality of RF (radio frequency) chains, a plurality of antennas, a plurality of switching components, and control circuitry operatively coupled to the plurality of switching components. A total quantity of RF chains is equal to a first value, and a total quantity of antennas is equal to a second value that is less than the first value. The plurality of RF chains includes a first plurality of RF chains to support communication on a first RF band and a second plurality of RF chains to support communication on a second RF band. The plurality of antennas includes a first antenna configured to communicate on the first RF band, a second antenna configured to communicate on the second RF band different from the first RF band, and a third antenna configured to communicate on the first and second RF bands.

This approach permits use of antennas operating at two different frequency bands, which helps reduce the total number of antennas in the device, while reducing the amount of switching on a path. The arrangement also provides for reduced insertion loss and provides simplified and flexible routing of RF paths. It can also help in locating RF front end components near their respective antennas, hence improving the link budget of the device.

In some embodiments, a multiple-input, multiple-output (MIMO) transceiver comprises a plurality of RF chains, a plurality of antennas, a plurality of switching components, and control circuitry operatively coupled to the plurality of switching components. In some examples, a total quantity of RF chains included in the plurality of RF chains is equal to a first value, and a total quantity of antennas included in the plurality of antennas is equal to a second value that is less than the first value.

In some embodiments, the plurality of RF chains comprises a first plurality of RF chains comprising electronics configured to support communication on a first RF band and a second plurality of RF chains comprising electronics configured to support communication on a second RF band.

In some embodiments, the plurality of antennas includes a first antenna configured to communicate on the first RF band, a second antenna configured to communicate on a second RF band different from the first RF band, and a third antenna configured to communicate on the first and second RF bands. In some examples, the plurality of switching components comprises a first switching component electrically coupled to two of the first plurality of RF chains, the first antenna, and the third antenna. In some examples, the plurality of switching components further comprises a second switching component electrically coupled to two of the second plurality of RF chains, the second antenna, and the third antenna.

In some embodiments, the control circuitry may be configured to selectively cause the first switching component to toggle between (i) a state in which a first one of the first plurality of RF chains is electrically coupled to the first antenna and a second one of the plurality of the RF chains is electrically coupled to the third antenna, and (ii) a state in which the first one of the first plurality of the RF chains is electrically coupled to the third antenna and the second one of the first plurality of RF chains is electrically coupled to the first antenna. In some examples, the control circuitry may be configured to selectively cause the second switching component to toggle between (i) a state in which a first one of the second plurality of RF chains is electrically coupled to the second antenna and a second one of the second plurality of RF chains is electrically coupled to the third antenna, and (ii) a state in which the first one of the second plurality of RF chains is electrically coupled to the third antenna and the second one of the second plurality of RF chains is electrically coupled to the second antenna.

In some embodiments, the transceiver is configured to communicate with a base station. In some such embodiments, the transceiver is configured to selectively cause the first and/or second switching component to toggle from states in response to receiving a command to do so from the base station. In at least some of these embodiments, the transceiver is configured to communicate with the base station in accordance with a time division duplexing (TDD) protocol. Furthermore, in some such embodiments, the transceiver is configured to selectively cause the first and/or second switching component to toggle from states in accordance with an SSR protocol.

In some embodiments, the transceiver further comprises a diplexer. In these embodiments, the first and second switching components are electrically coupled to the third antenna by way of the diplexer.

In some embodiments, each switching component in the plurality of switching components is a double-pole double-throw switch.

In some embodiments, the transceiver is configured to communicate with a base station.

In some embodiments, the plurality of antennas further includes:

a fourth antenna configured to communicate on the first RF band;

a fifth antenna configured to communicate on the second RF band; and a sixth antenna configured to communicate on the first and second RF bands.

In some embodiments, the plurality of switching components further includes:

a third switching component electrically coupled to two of the first plurality of RF chains, the fourth antenna, and the sixth antenna; and a fourth switching component electrically coupled to two of the second plurality of RF chains, the fifth antenna, and the sixth antenna.

In some embodiments, the control circuitry is further configured to:

selectively cause the third switching component to toggle between (i) a state in which a third one of the first plurality of RF chains is electrically coupled to the fourth antenna and a fourth one of the first plurality of the RF chains is electrically coupled to the sixth antenna, and (ii) a state in which the third one of the first plurality of the RF chains is electrically coupled to the sixth antenna and the fourth one of the first plurality of RF chains is electrically coupled to the fourth antenna; and selectively cause the fourth switching component to toggle between (i) a state in which a third one of the second plurality of RF chains is electrically coupled to the fifth antenna and a fourth one of the second plurality of the RF chains is electrically coupled to the sixth antenna, and (ii) a state in which the third one of the second plurality of the RF chains is electrically coupled to the sixth antenna and the fourth one of the second plurality of RF chains is electrically coupled to the fifth antenna.

In some embodiments, each switching component in the plurality of switching components is a triple pole triple throw switch.

In some embodiments, the first switching component is electrically coupled to the third switching component, and the second switching component is electrically coupled to the fourth switching component.

Some embodiments further include a diplexer, wherein the third and fourth switching components are electrically coupled to the sixth antenna by way of the diplexer.

In some embodiments, the first and second bands correspond to n78 and n79 bands, respectively.

In some embodiments, at least a portion of the RF chains comprises electronics configured to support communication RF transmission.

In some embodiments, at least a portion of the RF chains comprises electronics that are not configured to support communication RF transmission.

In some embodiments, at least a portion of the RF chains comprises electronics configured to support communication RF reception.

In some embodiments, all of the RF chains comprise electronics configured to support communication RF reception.

Some embodiments further include a wearable device comprising the MIMO transceiver described above.

According to some embodiments of the present invention, a communication device includes two first-band antennas, two second-band antennas, two dual-band antennas configured for communication in both the first frequency band and the second frequency band, four first-band receive chains, four second-band receive chains, two first-band transmit chains, and two first-band transmit chains. Each one of the four first-band receive chains is switchably coupled to a respective one of the two first-band antennas and the two dual-band antennas. Each one of the four second-band receive chains is switchably coupled to a respective one of the two second-band antennas and the two dual-band antennas. Each one of the two first-band transmit chains is switchably coupled to one of the two first-band antennas or a first one of the two dual-band antennas. Each one of the two second-band transmit chains is switchably coupled to one of the two second-band antennas or a second one of the two dual-band antennas.

In some embodiments, a communication device, comprising six antennas, eight receive chains, and four transmit chains. The six antennas comprise two first-band antennas, two second-band antennas, and two dual-band antennas. The two first-band antennas include a first first-band antenna and a second first-band antenna, configured for communication in a first frequency band. The two second-band antenna includes a first second-band antenna and a second second-band antenna, configured for communication in a second frequency band. The two dual-band antennas include a first dual-band antenna and a second dual-band antenna, configured for communication in both the first frequency band and second frequency band. The eight receive chains comprise four first-band receive chains and four second band receive chains. The four first-band receive chains includes first, second, third, and fourth first-band receive chains, configured for receiving signals in the first frequency band, each one of the four first-band receive chains being switchably coupled to a respective one of the two first-band antennas and the two dual-band antennas, The four second band receive chains include first, second, third, and fourth second-band receive chains, configured for receiving signals in the second frequency band, each one of the four second-band receive chains being switchably coupled to a respective one of the two second-band antennas and the two dual-band antennas. The four transmit chains comprise two first-band transmit chains and second-band transmit chains. The two first-band transmit chains include a first first-band transmit chain and a second first-band transmit chain, configured for transmitting signals in the first frequency band, each one of the two first-band transmit chains being switchably coupled to one of the two first-band antennas or a first one of the two dual-band antennas; and two second-band transmit chains. The two second-band transmit chains include a first second-band transmit chain and a second second-band transmit chain, configured for transmitting signals in the second frequency band, each one of the two second-band transmit chains being switchably coupled to one of the two second-band antennas or a second one of the two dual-band antennas.

In some embodiments of the above communication device, each of the first first-band receive chain, the first first-band transmit chain, and the third first-band receive chain is switchably coupled to either the first first-band antenna or the first dual-band antenna through a first switch. Each of the third second-band receive chain, the first second-band transmit chain, and the first second-band receive chain is switchably coupled to either the first dual-band antenna or the first second-band antenna through a second switch. Each of the second first-band receive chain, the second first-band transmit chain, and the fourth first-band receive chain is switchably coupled to either the second first-band antenna or the second dual-band antenna through a third switch. Each of the fourth second-band receive chain, the first second-band transmit chain, and the second second-band receive chain is switchably coupled to either the second dual-band antenna or the second second-band antenna through a fourth switch.

In some embodiments, the communication device also includes a first diplexer and a second diplexer. The first diplexer couples the first dual-band antenna to the first switch and the second switch, and the second diplexer couples the second dual-band antenna to the third switch and the fourth switch.

In some embodiments, each of the first switch, the second switch, the third switch, and the fourth switch is a DPDT (double-pole double-throw, or 2P2T)) switch.

In some embodiments, the four first-band receive chains and the four second-band receive chains are configured to perform 4×4 MIMO (multiple-input multiple-output) down link (DL) communication, with carrier aggregation (CA) in the first and second frequency bands, with a base station. The two first-band transmit chains and the two second-band transmit chains are configured to perform 2×2 MIMO up link (UL) communication, in the first and second frequency bands, respectively, in TDD (time division duplexing) with a base station with UL antenna switching according to 1T2R SRS (sounding reference signal) protocol.

In some embodiments, the UL antenna switching comprises a first antenna switching state and a second antenna switching state.

In some embodiments, in the first antenna switching state, the first first-band transmit chain is coupled to the first first-band antenna; the first second-band transmit chain is coupled to the first dual-band antenna, the second first-band transmit chain is coupled to the second first-band antenna, and the second second-band transmit chain is coupled to the second second-band antenna. In the second antenna switching state, the first first-band transmit chain is coupled to the first dual-band antenna, the first second-band transmit chain is coupled to the first second-band antenna, the second first-band transmit chain is coupled to the second dual-band antenna, and the second second-band transmit chain is coupled to the second second-band antenna.

In some embodiments, in the first antenna switching state, the first first-band transmit chain is coupled to the first first-band antenna, the first second-band transmit chain is coupled to the first dual-band antenna, the second first-band transmit chain is coupled to the second dual-band antenna, and the second second-band transmit chain is coupled to the second dual-band antenna. In the second antenna switching state, the first first-band transmit chain is coupled in the first dual-band antenna, the first second-band transmit chain is coupled to the first second-band antenna, the second first-band transmit chain is coupled to the second first-band antenna, and the second second-band transmit chain is coupled to the second second-band antenna.

In some embodiments, in the first antenna switching state, the first first-band transmit chain is coupled to the first dual-band antenna, the first second-band transmit chain is coupled to the first dual-band antenna, the second first-band transmit chain is coupled to the second first-band antenna, and the second second-band transmit chain is coupled to the second second-band antenna. In the second antenna switching state, the first first-band transmit chain is coupled to the first first-band antenna, the first second-band transmit chain is coupled to the first second-band antenna, the second first-band transmit chain is coupled to the second dual-band antenna, and the second second-band transmit chain is coupled to the second dual-band antenna.

In some embodiments, in the first antenna switching state, the first first-band transmit chain is coupled to the first dual-band antenna, the first second-band transmit chain is coupled to the first dual-band antenna, the second first-band transmit chain is coupled to the second dual-band antenna, and the second second-band transmit chain is coupled to the second dual-band antenna. In the second antenna switching state, the first first-band transmit chain is coupled to the first first-band antenna, the first second-band transmit chain is coupled to the first second-band antenna, the second first-band transmit chain is coupled to the second first-band antenna, and the second second-band transmit chain is coupled to the second second-band antenna.

In some embodiments, each one of the two first-band transmit chains is switchably coupled to any one of the two first-band antennas and the two dual-band antennas, and each one of the two second-band transmit chains is switchably coupled to any one of the two second-band antennas and the two dual-band antennas.

In some embodiments, each of the first switch, the second switch, the third switch, and the fourth switch is a 3P3T (triple-pole triple-throw) switch.

In some embodiments, the first switch is coupled to the third switch, and the second switch is coupled to the fourth switch.

In some embodiments, the two first-band transmit chains and the two second-band transmit chains are configured to perform 2×2 MIMO up link (UL) communication, in the first and second frequency bands, respectively, in TDD (time division duplexing) with a base station with UL antenna switching according to 1T4R SRS (sounding reference signal) protocol.

According to some embodiments of the present invention, a method for wireless communication includes providing a communication device having four first-band receive chains, four second-band receive chains, two first-band transmit chains, two second-band transmit chains, and six antennas. The method includes performing 4×4 MIMO (multiple-input multiple-output) down link (DL) communication with a base station, in the first and second frequency bands with carrier aggregation (CA). The method also includes performing 2×2 MIMO up link (UL) communication with the base station, in the first and second frequency bands, in TDD (time division duplexing), and performing up link antenna switching to connect a given transmit chain to one of two antennas based on a signal from the base station.

In some embodiments, the six antennas include two first-band antennas, two second-band antennas, and two dual-band antennas, the two dual-band antennas configured to operate in the first-band and the second-band.

In some embodiments, the method also includes coupling the transmit chains and the receiver chains to the antennas using four 2P2T switches and two diplexers.

In some embodiments, the antenna switching is performed according to a 2T4R (two transmitter and four receiver) SRS (sounding reference signal) protocol.

In some embodiments, the method also includes performing up link antenna switching to connect a given transmit chain to one of four antennas based on a signal from the base station according to a 1T4R (one transmitter and four receiver) SRS (sounding reference signal) protocol.

In some embodiments, the method also includes coupling the transmit chains and the receiver chains to the antennas using four 3P3T switches and two diplexers.

A further understanding of the nature and advantages of the present invention may be realized by reference to the remaining portions of the specification and the drawings.

BRIEF DESCRIPTION OF THE DRAWINGS

FIG. 2A is a simplified block diagram illustrating a down link (DL) 4×4 MIMO configuration with four antennas for receiving streams according to some embodiments of the present invention;

FIG. 2B is a simplified block diagram illustrating an up link (UL) 2×2 MIMO configuration with two antennas for transmitting streams according to some embodiments of the present invention;

FIG. 7D is a table listing the connections between the transmit and receive chains and the antennas in the first antenna switching state and the second antenna switching state according to some embodiments of the present invention;

FIG. 7E is a table listing the connections between the transmit and receive chains and the antennas in the first antenna switching state and the second antenna switching state according to some embodiments of the present invention;

FIG. 10 is a simplified block diagram illustrating another example of the communication device of FIG. 7A according to some embodiments of the present invention;

DETAILED DESCRIPTION OF THE INVENTION

The present disclosure describes systems and methods for antenna switching on devices. Some embodiments provide for sounding reference signal (SRS) uplink (UL) antenna switching on devices that employ six total antennas to support the use of different frequency bands, such as 5G new radio (NR) bands n78+n79 downlink (DL) carrier aggregation (CA) with 4×4 MIMO operation.

Frequency bands for 5G NR are being separated into two different frequency ranges. One is Frequency Range 1 (FR1) that includes sub-6 GHz frequency bands, some of which are bands traditionally used by previous standards, but has been extended to cover potential new spectrum offerings from 410 MHz to 7125 MHz. The other is Frequency Range 2 (FR2) that includes frequency bands from 24.25 GHz to 52.6 GHz. Bands in this millimeter wave range have shorter range, but higher available bandwidth than bands in the FR1.

Practical MIMO systems usually require the antenna elements to be placed in limited space, due to the small size of the mobile terminals and the large number of antennas at the base station. In a MIMO system, antenna switching and carrier aggregation can be used to improve the quality of wireless communication. Antenna switching uses two or more antennas to improve the quality and reliability of a wireless link. In a switching receiver, the signal from only one antenna is fed to the receiver for as long as the quality of that signal remains above some prescribed threshold. If and when the signal degrades, another antenna is switched in. Carrier aggregation is a technique used in wireless communication to increase the data rate per user, whereby multiple frequency blocks (called component carriers) are assigned to the same user. The data rate per user can be increased the more frequency blocks are assigned to a user. The sum data rate of a cell is increased as well because of a better resource utilization.

Figure 1:
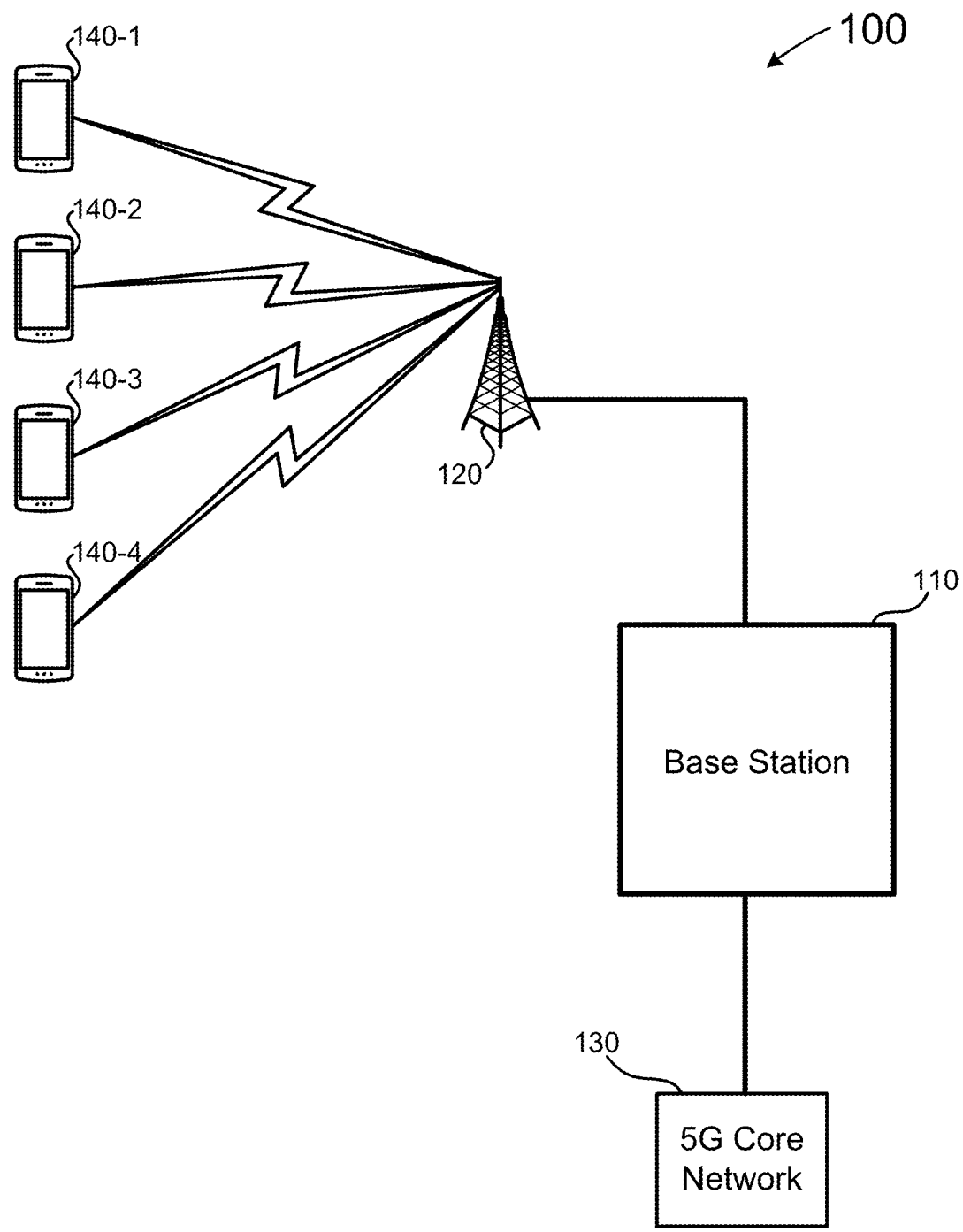
FIG. 1 is a simplified block diagram illustrating a cellular system for wireless communication according to some embodiments of the present invention.

FIG. 1 is a simplified block diagram illustrating a cellular system for telecommunication according to some embodiments of the present invention. FIG. 1 illustrates an embodiment of a cellular system 100 that can enable wireless communication according to various protocols. Cellular system 100 can include: base station 110, antenna tower 120, 5G core network 130, and user equipment (UE) 140 (including 140-1, 140-2, 140-3, and 140-4). While cellular system 100 refers to 5G in FIG. 1, the embodiments detailed herein can be applicable to other types of cellular networks, such as a 4G Long Term Evolution (LTE) cellular network. In this example, cellular system 100 operates according to the 5G New Radio (NR) radio access technology (RAT).

UE 140 can be various forms of communication devices that are capable of communication in cellular system 100. For instance, UE 140 can be smartphones, wireless modems, cellular phones, laptop computers, wireless access points (APs), wearable devices, VR (virtual reality) or AR (augmented reality) headsets, etc. In response to signals received from base station 110, each UE may engage in wireless communication according to various protocols.

FIG. 2A is a simplified block diagram illustrating a down link (DL) 4×4 MIMO (multiple-input and multiple-output) configuration with four antennas for receiving streams according to some embodiments of the present invention. In 4×4 MIMO, the base station transmits four different signals (or streams) via four transmit antennas to one user equipment (UE). The UE is equipped with four antennas to receive the signals. FIG. 2A shows four receive chains for frequency band Band-x: BAND-x RX Chain-0, BAND-x RX Chain-1, BAND-x RX Chain-2, and BAND-x RX Chain-3. The four receive chains are configured to receive signals from four antennas, ANT-0 BAND-x, ANT-1 BAND-x, ANT-2 BAND-x, and ANT-3 BAND-x, respectively, for performing 4×4 MIMO down link (DL) operation.

As used herein, an RF chain refers to RF front-end modules (e.g., amplifiers, filters, switches, mixers, A/D converters, etc.) that support a radio frequency signal handling of a wireless antenna. A receive chain refers to RF front-end modules that support receiving a radio frequency signal from a wireless antenna. A transmit chain refers to RF front-end modules that support transmitting a radio frequency signal through a wireless antenna. An RF chain can include a receive chain, a transmit chain, or a combination thereof.

FIG. 2B is a simplified block diagram illustrating an up link (UL) 2×2 MIMO configuration with two antennas for transmitting streams according to some embodiments of the present invention. A 2×2 MIMO device has two antennas for two simultaneous data streams. FIG. 2B shows two transmit chains for frequency band Band-x: BAND-x TX Chain-0 and BAND-x TX Chain-1. The two transmit chains are configured to transmit signals to two antennas, ANT-0 BAND-x and ANT-1 BAND-x, respectively for performing 2×2 MIMO up link (UL) operation.

Figure 2C:
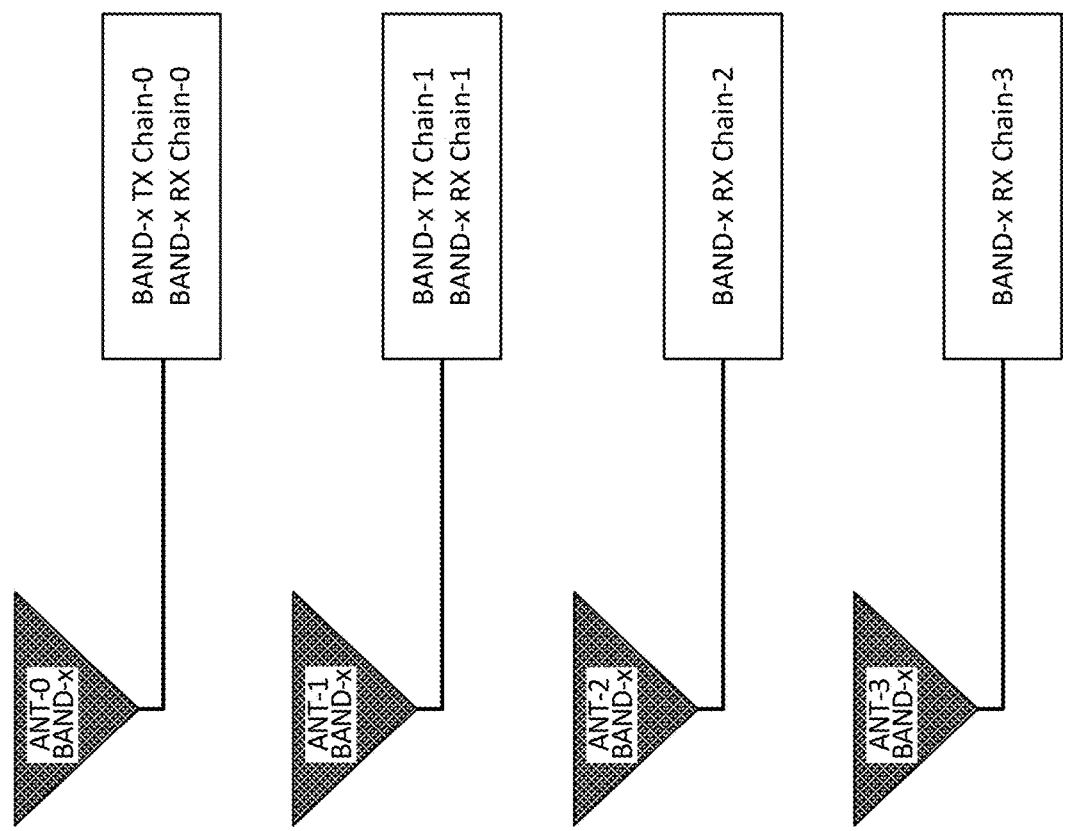
FIG. 2C is a simplified block diagram illustrating DL 4×4 MIMO and UL 2×2 MIMO configuration with time division multiplexing (TDD) using four antennas for RX streams and two antennas for 2 TX streams a simplified block diagram illustrating.

FIG. 2C is a simplified block diagram illustrating DL 4×4 MIMO and UL 2×2 MIMO configuration with time division multiplexing (TDD) using four antennas for RX streams and two antennas for 2 TX streams. FIG. 2C shows four receive chains for frequency band Band-x: BAND-x RX Chain-0, BAND-x RX Chain-1, BAND-x RX Chain-2, and BAND-x RX Chain-3. The four receive chains are configured to receive signals from four antennas, ANT-0 BAND-x, ANT-1 BAND-x, ANT-2 BAND-x, and ANT-3 BAND-x, respectively, for performing 4×4 MIMO down link (DL) operation. FIG. 2C shows two transmit chains for frequency band Band-x: BAND-x TX Chain-0 and BAND-x TX Chain-1. The two transmit chains are configured to transmit signals to two antennas, ANT-0 BAND-x and ANT-1 BAND-x, respectively, for performing 2×2 MIMO up link (UL) operation. In time division multiplexing (TDD), the receiving streams and the transmitting streams take place at different times. Therefore, the same two antennas, ANT-0 BAND-x and ANT-1 BAND-x, can be used for both the receiving streams and the transmitting streams. As shown in FIG. 2C, receive chain BAND-x RX Chain-0 and transmit chain BAND-x TX Chain-0 are both coupled to the same antenna, ANT-0 BAND-x. Similarly, receive chain BAND-x RX Chain-1 and transmit chain BAND-x TX Chain-1 share one antenna, ANT-0 BAND-x. For TDD bands, in some embodiments, there can be a TX/RX switch between the TX chain(s) and Rx chains so that in total four BAND-x capable antennas would be used to support DL 4×4 MIMO and UL 2×2 MIMO for that band.

Figure 3A:
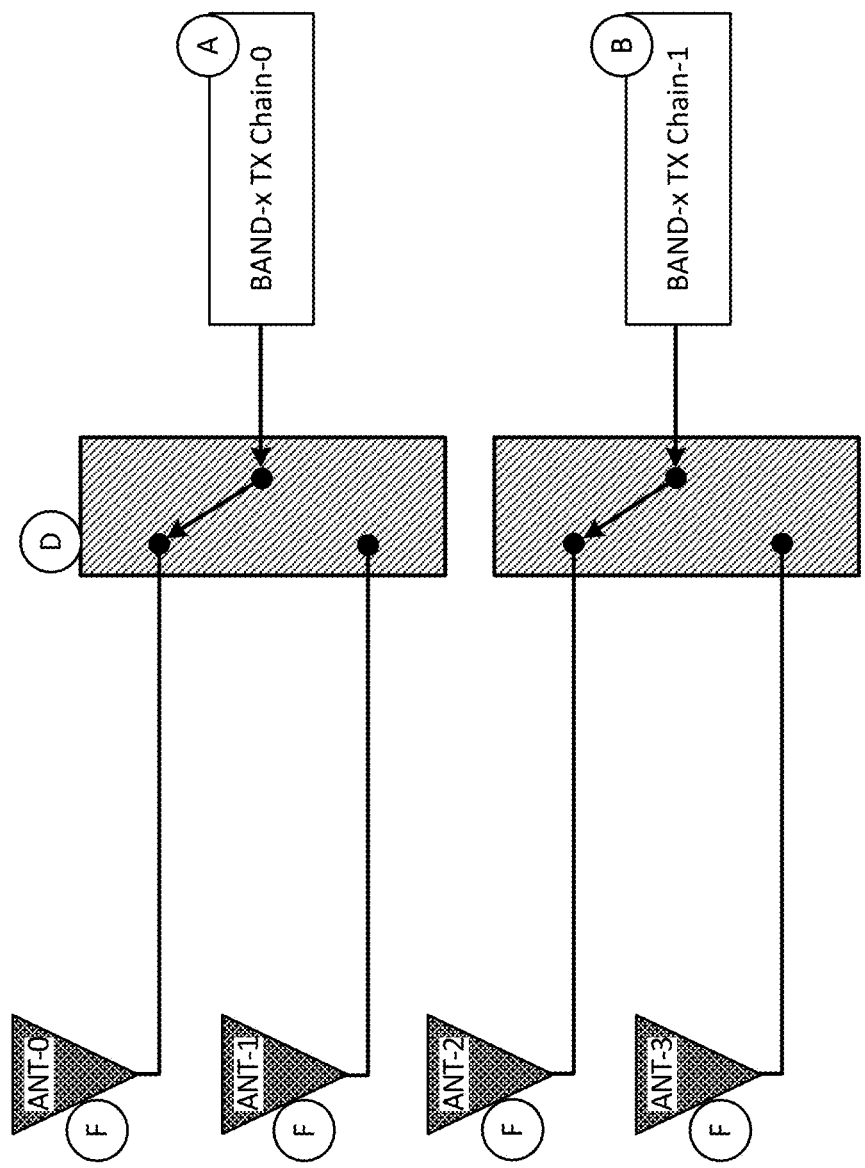
FIG. 3A is a simplified block diagram illustrating an example of the transmitting path switching used to support 2T4R (1T2R+1T2R) (2TX Chains, 4 Antennas) SRS scenario according to some embodiments of the present invention.

FIG. 3A is a simplified block diagram illustrating an example of the transmitting path switching used to support 2T4R (more specifically 1T2R+1T2R, with 2TX chain, 4 Antennas) sounding reference signal (SRS) scenario according to some embodiments of the present invention. In sounding reference signal (SRS) uplink (UL) transmission, the transmit chain may switch to a different antenna based on an instruction from a base station. In FIG. 3A, transmit chain BAND-x TX Chain-0 is coupled to two antennas ANT-0 and ANT-1 through a switch, and can switch antennas in a 1T2R SRS uplink (UL) transmission. Similarly, transmit chain BAND-x TX Chain-1 is coupled to two antennas ANT-2 and ANT-3 through a second switch, and can switch antennas in a 1T2R SRS uplink (UL) transmission. With the two antennas in FIG. 3A, 2T4R (2TX chain, 4 Antennas) sounding reference signal (SRS) can be implemented.

Figure 3B:
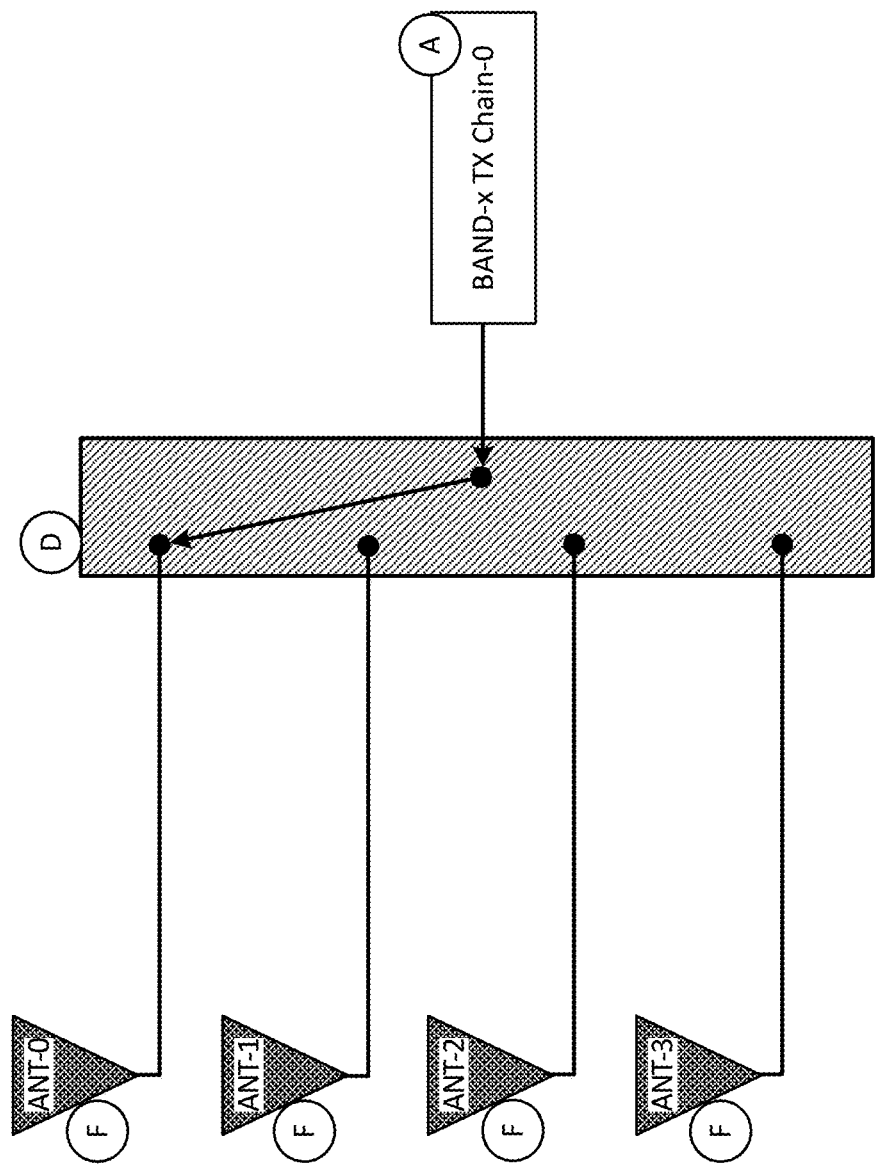
FIG. 3B is a simplified block diagram illustrating an example of the transmitting path switching used to support 1T4R (1 TX chain, 4 Antennas) SRS scenario according to some embodiments of the present invention.

FIG. 3B is a simplified block diagram illustrating an example of the transmitting path switching used to support a 1T4R (1 TX chain, 4 Antennas) SRS scenario according to some embodiments of the present invention. In FIG. 3B, transmit chain BAND-x TX Chain-0 is coupled to four antennas ANT-0, ANT-1, ANT-2, and ANT-3 through a switch, and can switch among the four antennas in a 1T4R SRS uplink (UL) transmission.

The embodiments described below relate to implementing antenna switching to support UL transmitter SRS antenna switching on 5G NR FR1 capable devices, also described as user equipment (UE). The UE can employ six antennas to support DL CA with 4×4 MIMO on 5G NR FR1 TDD bands (e.g., n78 and n79) while also supporting 2×2 UL MIMO on either n78 or n79 bands.

In some embodiments, two transmit chains can be active, operating in either n78 or n79 bands. At the same time, there could be four simultaneous receive chains that are active in each of n78 and n79 bands (e.g., for a total of 8 receive chains). In an exemplary six antenna scheme, two antennas may support both n78 and n79 bands, while two antennas may be dedicated to n78 band, and another two antennas are dedicated to n79 bands.

Under UL SRS switching, the UE under base station (BS) controls is configured to switch either one or both UL TX chains (e.g., operating either n78 or n79) to any of the four antennas available for that band on the UE, while at the same time keeping all eight independent receiver chains active to support 4×4 DL CA in n78 and n79 bands.

As used herein, in time division duplex (TDD), a single frequency band is used for both transmit and receive. Then it shares that band by assigning alternating time slots to transmit and receive operations. For example, in some embodiments of the invention, carrier aggregation is implemented such that the n-78 band and the n-79 band are assigned to the same user.

In some embodiments, the switching scheme implemented on UE employs n78-n79 band diplexers and two pairs of double-pole double-throw (DPDT) switches with ports arranged to support two transmit and four receive (2T4R) SRS switching while simultaneously supporting DL CA with 4×4 MIMO on 5G NR FR1 TDD in N78 and n79 bands and also supporting 2×2 UL MIMO on either n78 or n79 bands. This switching scheme provides the advantage of minimizing insertion loss through use of lower loss DPDT switches instead of larger switches. The arrangement of diplexers and DPDT switches enables reduction of a required number of antennas. Use of two pairs of DPDT switches (e.g., instead of 2×4P4T switches) provides for layout flexibility and ease in configuring devices such that radio frequency (RF) front end components are located near their respective antennas, hence improving link budget of the device and resulting in better overall radiated power and sensitivity performance of the device.

In some embodiments, another switching scheme is employed, which makes use of two pairs of triple-pole triple-throw (3P3T) switches in conjunction with n78-n79 band diplexers on UE, that supports both 1 transmit and 4 receive (1T4R) and 2 transmit and 4 receive (2T4R) SRS switching, while simultaneously supporting DL CA with 4×4 MIMO on 5G NR FR1 TDD in N78 and n79 bands and also supporting 2×2 UL MIMO on either n78 or n79 bands. This switching scheme provides the benefits of minimizing insertion loss and layout flexibility.

In some embodiments, the n78 band spans a frequency range of approximately 3.3 GHz to 3.8 GHz, and the n79 band spans a frequency range of approximately 4.4 GHz to 5 GHz. Other suitable frequency ranges may also be supported by embodiments of the invention.

Some embodiments provide a 5G NR FR1 (FR1=Sub 6 GHz frequency spectrum) device that can operate in TDD in N78 and n79 bands and that supports one or more of the following features: n78-n79 DL CA; n78 and n79 DL 4×4 MIMO; UL 2×2 MIMO supported on the TX band; and/or SRS for TX. In some embodiments, 2T4R is supported, applicable to devices supporting UL 2×2 MIMO. In some embodiments, 2T4R and 1T4R are supported, applicable to devices supporting UL 2×2 MIMO or single UL.

The 5G-NR device in this scheme could be a non-standalone (NSA) mode device using an LTE anchor, or a standalone (SA) mode device. There is no UL CA requirement between n78 and n79, meaning that either n78 TX or n79 TX may be active at a time but, not both. The system utilizes TDD slot synchronization between both n78 and n79 bands, since most current diplexers available in the market, would not be able to provide enough transmit-receive isolation between the n78 and n79 bands due the proximity of the frequency bands.

Embodiments support simultaneous operation of n78 and n79 bands (DL CA), while also supporting DL 4×4 MIMO (e.g., FIG. 2) and 2T4R/1T4R (e.g., FIGS. 3A and 3B) for each of these bands.

Figure 4:
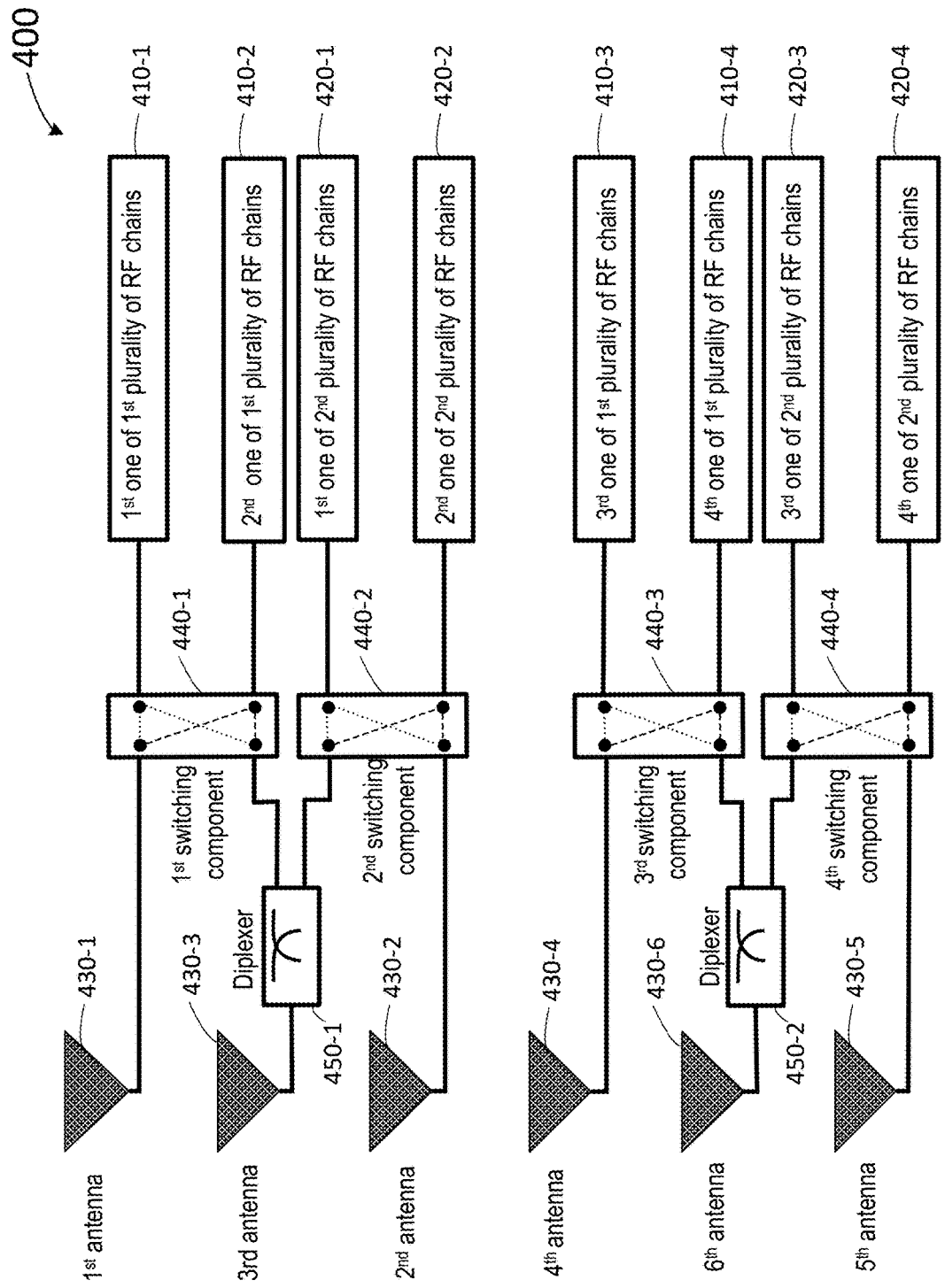
FIG. 4 is a simplified block diagram illustrating an example of a MIMO transceiver according to some embodiments of the present invention.

FIG. 4 is a simplified block diagram illustrating an example of a MIMO transceiver according to some embodiments of the present invention. FIG. 4 illustrates a multiple-input, multiple-output (MIMO) transceiver 400 that comprises a plurality of RF chains (410-1, 410-2, 410-3, 410-4, 420-1, 420-2, 420-3, and 420-4), a plurality of antennas (430-1, 430-2, 430-3, 430-4, 430-5, and 430-6), a plurality of switching components (440-1, 440-2, 440-3, and 440-4), and control circuitry (not shown) operatively coupled to the plurality of switching components. In some examples, a total quantity of RF chains included in the plurality of RF chains is equal to a first value, and a total quantity of antennas included in the plurality of antennas is equal to a second value that is less than the first value. In the example of FIG. 4, the total quantity of RF chains included in the plurality of RF chains is equal to a first value, 8, and a total quantity of antennas included in the plurality of antennas is equal to a second value, 6, that is less than the first value. However, it is understood that the first value and the second value can be other values.

In some embodiments, the plurality of RF chains comprises a first plurality of RF chains 410 (including 410-1 and 410-2) comprising electronics configured to support communication on a first RF band, and a second plurality of RF chains 420 (including 420-1 and 420-2) comprising electronics configured to support communication on a second RF band. In some embodiments, the plurality of antennas 430 includes a first antenna 430-1 configured to communicate on the first RF band, a second antenna 430-2 configured to communicate on a second RF band different from the first RF band, and a third antenna 430-3 configured to communicate on the first and second RF bands. In some examples, the plurality of switching components 440 comprises a first switching component 440-1 electrically coupled to two of the first plurality of RF chains 410, the first antenna, 430-1, and the third antenna 430-3. In some examples, the plurality of switching components 440 further comprises a second switching component 440-2 electrically coupled to two of the second plurality of RF chains 420, the second antenna 430-2, and the third antenna 430-3.

In some embodiments, the control circuitry may be configured to selectively cause the first switching component 440-1 to toggle between (i) a first state in which a first one of the first plurality of RF chains 410-1 is electrically coupled to the first antenna 430-1 and a second one of the plurality of the RF chains 410-2 is electrically coupled to the third antenna 430-3, and (ii) a second state in which the first one of the first plurality of the RF chains 410-1 is electrically coupled to the third antenna 430-3 and the second one of the first plurality of RF chains 410-2 is electrically coupled to the first antenna 430-1. In FIG. 4, the signal paths in the first state and the second state are shown by the dotted lines and the broken lines in the first switching component 440-1. In some examples, the control circuitry may be configured to selectively cause the second switching component 440-2 to toggle between (i) a state in which a first one of the second plurality of RF chains 420-1 is electrically coupled to the second antenna 430-2 and a second one of the second plurality of RF chains 420-2 is electrically coupled to the third antenna 430-3, and (ii) a state in which the first one of the second plurality of RF chains 420-1 is electrically coupled to the third antenna 430-3 and the second one of the second plurality of RF chains 420-2 is electrically coupled to the second antenna 430-2. In FIG. 4, the signal paths in the first state and the second state are shown by the dotted lines and the broken lines in the second switching component 440-2.

In some embodiments, the transceiver 400 is configured to communicate with a base station (not shown). In some such embodiments, the transceiver 400 is configured to selectively cause the first 440-1 and/or second 440-2 switching component to toggle from states in response to receiving a command to do so from the base station. In at least some of these embodiments, the transceiver 400 is configured to communicate with the base station in accordance with a time division duplexing (TDD) protocol. Furthermore, in some such embodiments, the transceiver 400 is configured to selectively cause the first 440-1 and/or second 440-2 switching component to toggle from states in accordance with an SRS protocol.

In some embodiments, the transceiver 400 further comprises a diplexer 450-1. In these embodiments, the first 440-1 and second 440-2 switching components are electrically coupled to the third antenna 430-3 by way of the diplexer 450-1.

In some embodiments, each switching component in the plurality of switching components 440 is a double-pole double-throw (DPDT) switch.

In some embodiments, the plurality of antennas further includes a fourth antenna 430-4 configured to communicate on the first RF band, a fifth antenna 430-5 configured to communicate on the second RF band, and a sixth antenna 430-6 configured to communicate on the first and second RF bands.

In some embodiments, the plurality of switching components further includes a third switching component 440-3 electrically coupled to two of the first plurality of RF chains (410-3 and 410-4), the fourth antenna 430-4, and the sixth antenna 430-6. A fourth switching component 440-4 is electrically coupled to two of the second plurality of RF chains (420-3 and 420-4), the fifth antenna 430-5, and the sixth antenna 430-6.

In some embodiments, the control circuitry is further configured to selectively cause the third switching component to toggle between (i) a state in which a third one of the first plurality of RF chains is electrically coupled to the fourth antenna and a fourth one of the first plurality of the RF chains is electrically coupled to the sixth antenna, and (ii) a state in which the third one of the first plurality of the RF chains is electrically coupled to the sixth antenna and the fourth one of the first plurality of RF chains is electrically coupled to the fourth antenna. The control circuitry is further configured to selectively cause the fourth switching component to toggle between (i) a state in which a third one of the second plurality of RF chains is electrically coupled to the fifth antenna and a fourth one of the second plurality of the RF chains is electrically coupled to the sixth antenna, and (ii) a state in which the third one of the second plurality of the RF chains is electrically coupled to the sixth antenna and the fourth one of the second plurality of RF chains is electrically coupled to the fifth antenna.

In some embodiments, each switching component in the plurality of switching components is a triple pole triple throw switch.

In some embodiments, the first switching component is electrically coupled to the third switching component, and the second switching component is electrically coupled to the fourth switching component.

Some embodiments further include a diplexer, wherein the third and fourth switching components are electrically coupled to the sixth antenna by way of the diplexer.

In some embodiments, the first and second bands correspond to n78 and n79 bands, respectively.

In some embodiments, at least a portion of the RF chains comprises electronics configured to support RF transmission.

In some embodiments, at least a portion of the RF chains comprises electronics that are not configured to support RF transmission.

In some embodiments, at least a portion of the RF chains comprises electronics configured to support RF reception.

In some embodiments, all of the RF chains comprise electronics configured to support RF reception.

Some embodiments further include a wearable device comprising the MIMO transceiver described above.

Figure 5:
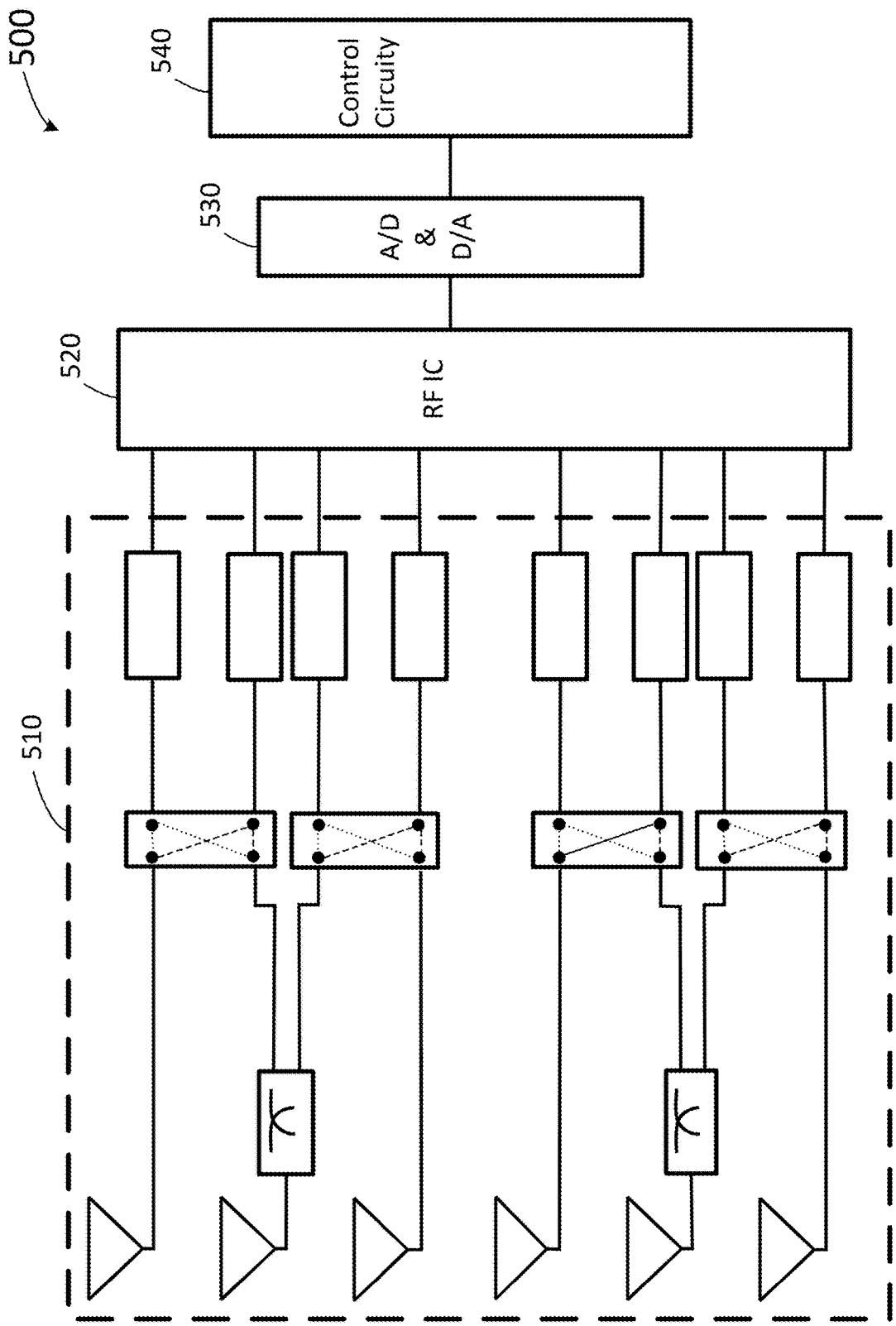
FIG. 5 is a simplified block diagram illustrating a communication device according to some embodiments of the present invention.

FIG. 5 is a simplified block diagram illustrating part of a communication device according to some embodiments of the present invention. Communication device 500 can represent a smartphone, wireless modem, cellular phone, laptop computer, wireless access point (AP), wearable devices, VR (virtual reality) or AR (augmented reality) headset, etc. As shown in FIG. 5, communication device 500 includes a transceiver 510, an RF IC 520, D/A and A/D modules 530, and control circuitry 540. Control circuitry 540 can include a baseband processor providing signal processing, network management, and other control functions. Transceiver 510 can be similar to transceiver 400 of FIG. 4, and can include antennas, diplexers, switches, and RF chains. RF IC 520 can include circuitries or modules for up conversion, down conversion, mixing componentry, etc. Control circuitry 540 can include one or more processors, etc.

Figure 6:
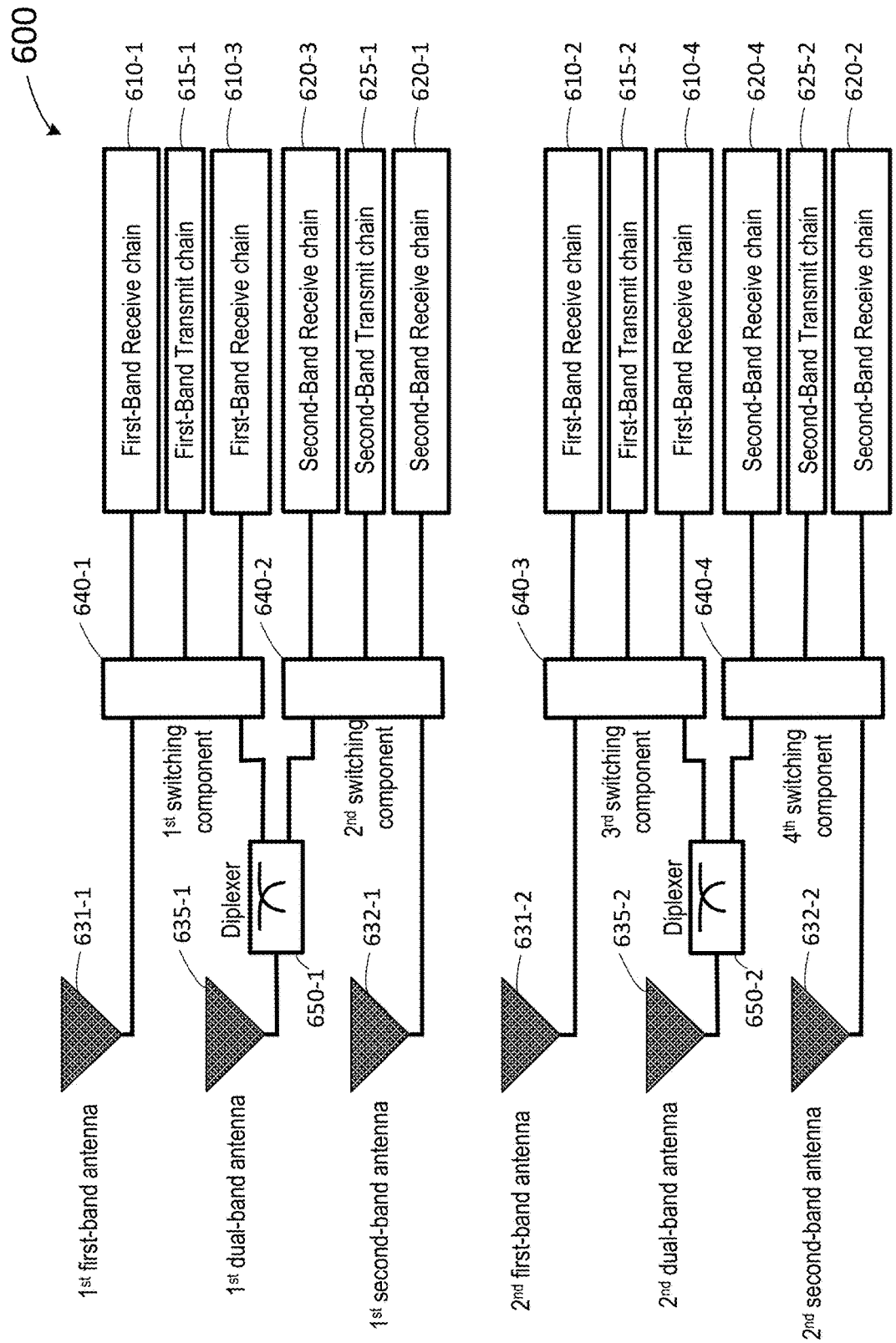
FIG. 6 is a simplified block diagram illustrating part of a communication device according to some embodiments of the present invention.

FIG. 6 is a simplified block diagram illustrating part of a communication device according to some embodiments of the present invention. As shown in FIG. 6, communication device 600 includes eight receive chains (610-1, 610-2, 610-3, 610-4, 620-1, 620-2, 620-3, and 620-4), four transmit chains (615-1, 615-2, 625-1, and 625-2), and six antennas (631-1, 631-2, 632-1, 632-2, 635-1, and 635-2). The six antennas include two first-band antennas 631, having a first first-band antenna 631-1 and a second first-band antenna 631-2, both configured for communication in a first frequency band. The six antennas also include two second-band antennas 632, including a first second-band antenna 632-1 and a second second-band antenna 632-2 configured for communication in a second frequency band. The six antennas further include two dual-band antennas 635, including a first dual-band antenna 635-1 and a second dual-band antenna 635-2, configured for communication in both the first frequency band and second frequency band.

In communication device 600, the eight receive chains include four first-band receive chains 610, including first 610-1, second 610-2, third 610-3, and fourth 610-4 first-band receive chains, configured for receiving signals in the first frequency band. Each one of the four first-band receive chains 610 is switchably coupled to a respective one of the two first-band antennas 631 and the two dual-band antennas 635. The eight receive chains also include four second band receive chains 620, including first 620-1, second 620-2, third 620-3, and fourth 620-4 second-band receive chains, configured for receiving signals in the second frequency band. Each one of the four second-band receive chains 620 is switchably coupled to a respective one of the two second-band antennas 632 and the two dual-band antennas 635. The four transmit chains include two first-band transmit chains 615, including a first first-band transmit chain 615-1, and a second first-band transmit chain 615-2, configured for transmitting signals in the first frequency band. Each one of the two first-band transmit chains 615 is switchably coupled to one of the two first-band antennas 631 or a first one of the two dual-band antennas 635. The four transmit chains also include two second-band transmit chains 625, including a first second-band transmit chain 625-1, and a second second-band transmit chain 625-2, configured for transmitting signals in the second frequency band. Each one of the two second-band transmit chains 625 is switchably coupled to one of the two second-band antennas 632 or a second one of the two dual-band antennas 635.

In communication device 600 of FIG. 6, the first first-band receive chain 610-1 is switchably coupled to either the first first-band antenna 631-1 or the first dual-band antenna 635-1 through a first switch 640-1. The first first-band transmit chain 615-1 is switchably coupled to either the first first-band antenna 631-1 or the first dual-band antenna 635-1 through a first switch 640-1. The third first-band receive chain 610-3 is switchably coupled to either the first dual-band antenna 635-1 or the first first-band antenna 631-1 through the first switch 640-1. The third second-band receive chain 620-3 is switchably coupled to either the first dual-band antenna 635-1 or the first second-band antenna 632-1 through a second switch 670-2. The first second-band transmit chain 625-1 is switchably coupled to either the first dual-band antenna 635-1 or the first second-band antenna 632-1 through the second switch 670-2. The first second-band receive chain 620-1 is switchably coupled to either the first second-band antenna 632-1 or the first dual-band antenna 635-1 through the second switch 640-2. The second first-band receive chain 610-2 is switchably coupled to either the second first-band antenna 631-2 or the second dual-band antenna 635-2 through a third switch 640-3. The second first-band transmit chain 615-2 is switchably coupled to either the second first-band antenna 631-2 or the second dual-band antenna 635-2 through the third switch. The fourth first-band receive chain 610-4 is switchably coupled to either the second dual-band antenna 635-2 or the second first-band antenna 631-2 through the third switch 640-3. The fourth second-band receive chain 620-4 is switchably coupled to either the second dual-band antenna 635-2 or the second second-band antenna 632-2 through a fourth switch 640-4. The second second-band transmit chain 625-2 is switchably coupled to either the second dual-band antenna 635-2 or the second second-band antenna 632-2 through a fourth switch 640-4. The second second-band receive chain 620-2 is switchably coupled to either the second second-band antenna 632-2 or the second dual-band antenna 635-2 through the fourth switch 640-4.

As shown in FIG. 6, communication device 600 also includes a first diplexer 650-1 and a second diplexer 650-2. The first diplexer 650-1 couples the first dual-band antenna 635-1 to the first switch 640-1 and the second switch 640-2. The second diplexer 650-2 couples the second dual-band antenna 635-2 to the third switch 640-3 and the fourth switch 640-4.

Figure 7A:
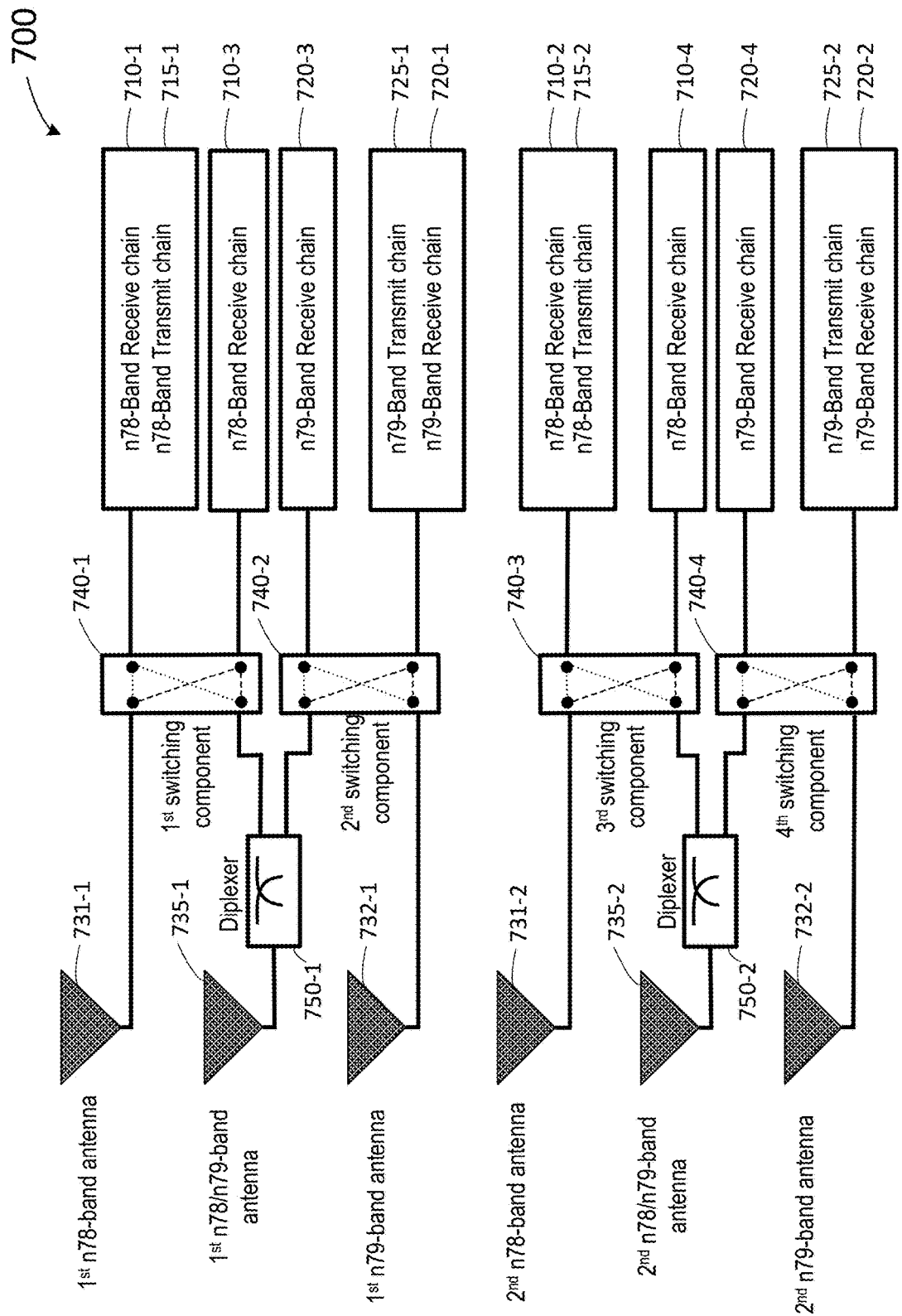
FIG. 7A is a simplified block diagram illustrating part of a communication device according to some embodiments of the present invention.

FIG. 7A is a simplified block diagram illustrating part of a communication device 700 according to some embodiments of the present invention. FIG. 7A illustrates an example of 2T4R (1T2R+1T2R) SRS configuration in n78+n79 bands DL CA with DL 4×4 MIMO on n78+n79 and UL 2×2 MIMO n78/n79 with SRS antenna switching.

Similar to communication device 600 in FIG. 6, communication device 700 in FIG. 7A also includes eight receive chains (710-1, 710-2, 710-3, 710-4, 720-1, 720-2, 720-3, and 720-4), four transmit chains (715-1, 715-2, 725-1, and 725-2), six antennas (731-1, 731-2, 732-1, 732-2, 735-1, and 735-2), four switching components (740-1, 740-2, 740-3, and 740-4), and two diplexers (750-1 and 750-2). However, in the example of FIG. 7, the four switching components (740-1, 740-2, 740-3, and 740-4) are implemented with double-pole double-throw (DPDT) switches. Each DPDT switch is configured to couple two receive chains and a transmit chain to two alternative antennas. Therefore, each of the two poles of the DPDT switch is coupled to a respective receive chain, and a transmit chain shares a pole of the DPDT switch with one of the receive chains. Further, the first frequency band is identified as the n78 band, and the second frequency band is identified as the n79 band. Each DPDT switch provides 1T2R switching of n78 or n79 transmit (TX) chain connected to that switch. The two diplexers (750-1 and 750-2) are n78+n79 diplexers, used to combine n78 and n79 paths for shared antennas.

In communication device 700 of FIG. 7A, the first first-band (n78-band) receive chain 710-1 is switchably coupled to either the first first-band (n78-band) antenna 731-1 or the first dual-band antenna 735-1 through a first switch 740-1. The third first-band (n78-band) receive chain 710-3 is switchably coupled to either the first dual-band (n78/n79-band) antenna 735-1 or the first first-band (n78-band) antenna 731-1 through the first switch 740-1. The third second-band (n79-band) receive chain 720-3 is switchably coupled to either the first dual-band (n78/n79-band) antenna 735-1 or the first second-band (n79-band) antenna 732-1 through a second switch 740-2. The first second-band (n79-band) receive chain 720-1 is switchably coupled to either the first second-band (n79-band) antenna 732-1 or the first dual-band (n78/n79-band) antenna 735-1 through the second switch 740-2. The second first-band (n78-band) receive chain 710-2 is switchably coupled to either the second first-band (n78-band) antenna 731-2 or the second dual-band (n78/n79-band) antenna 735-2 through a third switch 740-3. The fourth first-band (n78-band) receive chain 710-4 is switchably coupled to either the second dual-band (n78/n79-band) antenna 735-2 or the second first-band (n78-band) antenna 731-2 through the third switch 740-3. The fourth second-band (n79-band) receive chain 720-4 is switchably coupled to either the second dual-band (n78/n79-band) antenna 735-2 or the second second-band (n79-band) antenna 732-2 through a fourth switch 740-4. The second second-band (n79-band) receive chain 720-2 is switchably coupled to either the second second-band (n79-band) antenna 732-2 or the second dual-band (n78/n79-band) antenna 735-2 through the fourth switch 740-4.

In FIG. 7A, the first first-band (n78-band) transmit chain 715-1 shares a first pole of the first switch 740-1 with the first first-band (n78-band) receive chain 710-1, and is switchably coupled to either the first first-band (n78-band) antenna 731-1 or the first dual-band antenna 735-1 through a first switch 740-1. In some embodiments, the sharing of a single pole of the switch can be implemented through an additional single-pole double-throw (SPDT) switch. Similarly, the first second-band (n79-band) transmit chain 725-1 shares a first pole of the second switch 740-2 with the first second-band (n79-band) receive chain 720-1. The second first-band (n78-band) transmit chain 715-2 shares a first pole of the third switch 740-3 with the second first-band (n78-band) receive chain 710-2. The second second-band (n79-band) transmit chain 725-2 shares a first pole of the fourth switch 740-4 with the second second-band (n79-band) receive chain 720-2.

As described above, FIG. 7A illustrates an example of 2T4R (1T2R+1T2R) SRS configuration in n78+n79 Bands DL CA with DL 4×4 MIMO on n78+n79 and UL 2×2 MIMO n78/n79 with SRS antenna switching. This embodiment can reduce insertion loss by use of two pairs of DPDT switches (instead of arrangements that might use 2×4P4T switches). The arrangement of diplexers and DPDT switches enables reduction of required number of antennas. Further, the use of two pairs of DPDT switches (instead of 2×4P4T switches) can provide for layout flexibility and ease in locating RF front end components near their respective antennas and hence improving link budget of the device, for better total radiated power (TRP) and total isotropic sensitivity performance (TIS).

In communication device 700, the four first-band receive chains and the four second-band receive chains are configured to perform 4×4 MIMO (multiple-input multiple-output) down link (DL) communication, in the first and second frequency bands, respectively, with a base station with carrier aggregation (CA). Further, the two first-band transmit chains and the two second-band transmit chains are configured to perform 2×2 MIMO up link (UL) communication, in the first and second frequency bands, respectively, in TDD (time division duplexing) with a base station with UL antenna switching according to 1T2R SRS (sounding reference signal) protocol. The UL antenna switching includes a first switching state and a second antenna switching state, as described below with reference to FIGS. 7B and 7C. In some embodiments, only two TX chains in either the n78 band or the n79 band can be active at a time, whereas eight RX chains, i.e., four RX chains in the n78 band and four RX chains in the n79 band can be simultaneously active to support carrier aggregation (CA).

Figure 7B:
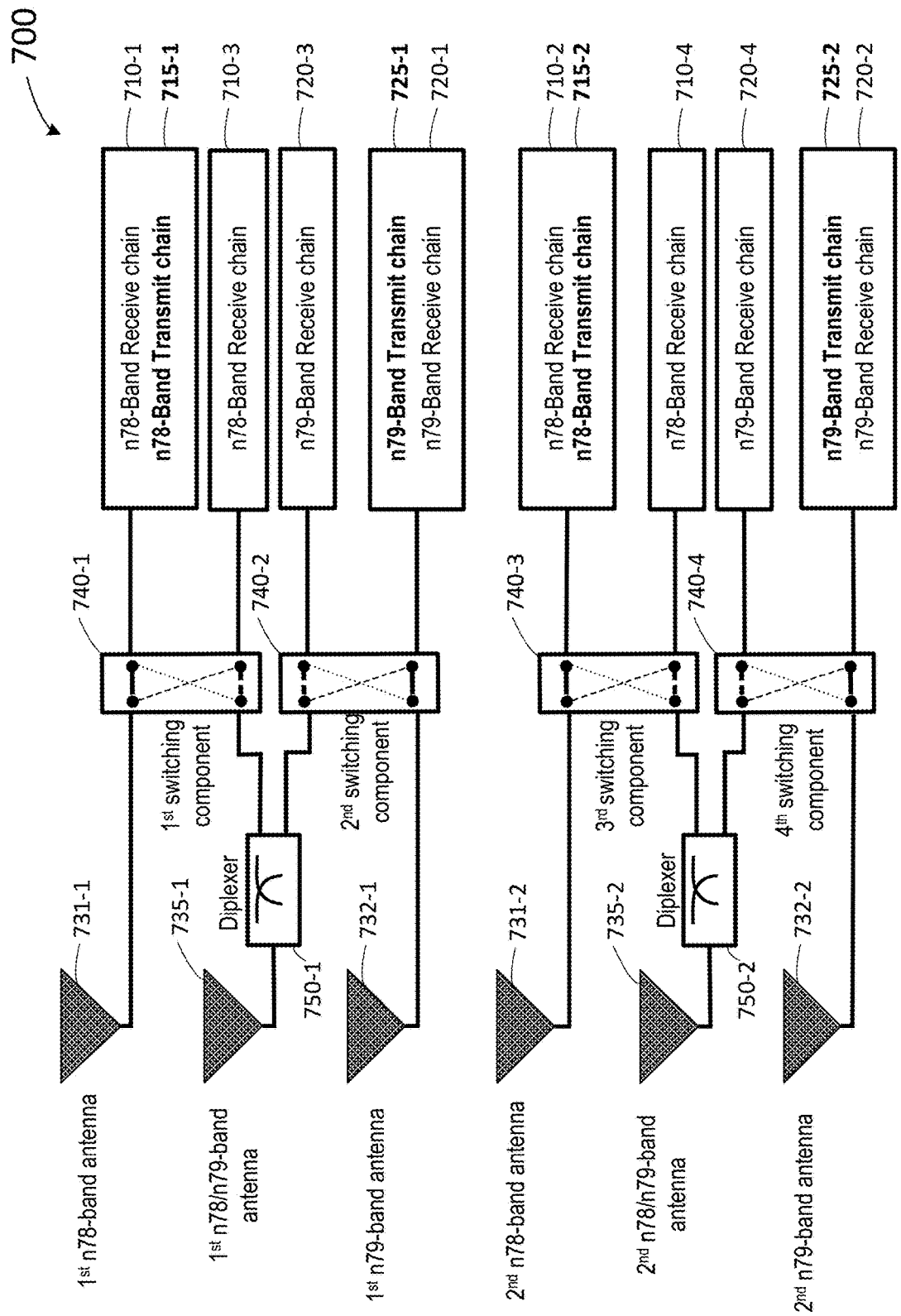
FIG. 7B is a simplified block diagram illustrating communication signal paths in a first antenna switching state of the communication device of FIG. 6A according to some embodiments of the present invention.

FIG. 7B is a simplified block diagram illustrating communication signal paths in a first antenna switching state of the communication device of FIG. 7A according to some embodiments of the present invention. FIG. 7B illustrates the connections between the transmit chains and the antennas in the first antenna switching state under the SRS UL antenna switching protocol. It can be seen that in the first antenna switching state, the first n78-band transmit chain 715-1 is coupled to the first n78-band antenna 731-1, the first n79-band transmit chain 725-1 is coupled to the first n79-band antenna 732-1, the second n78-band transmit chain 715-2 is coupled to the second n78-band antenna 731-2, and the second n79-band transmit chain 725-2 is coupled to the second n-79-band antenna 732-2. Since the receiver chains are not involved in the antenna switching, the connections of the receiver chains are shown in bold broken lines and are not described in detail here.

Figure 7C:
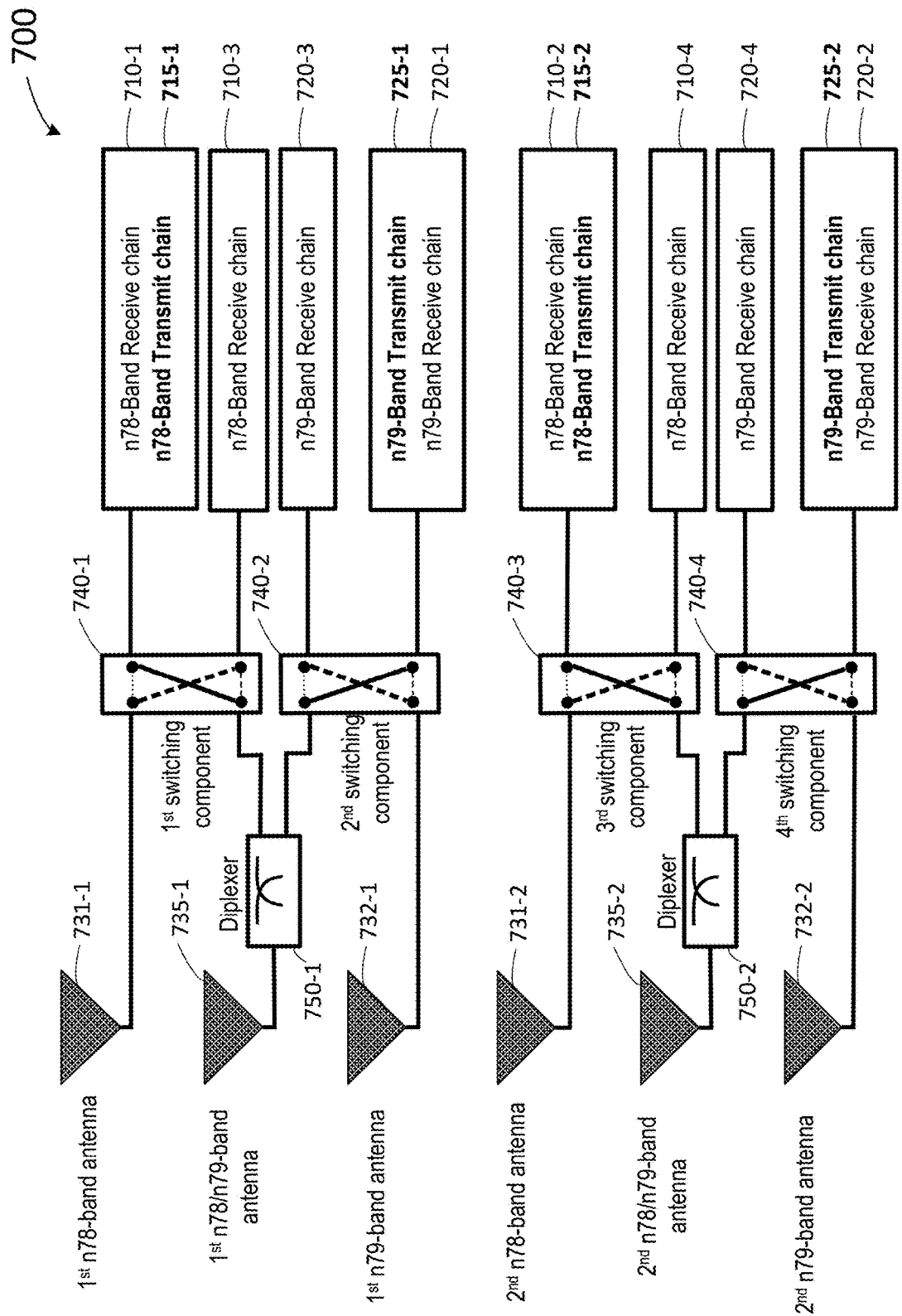
FIG. 7C is a simplified block diagram illustrating communication signal paths in a second antenna switching state of the communication device of FIG. 6A according to some embodiments of the present invention.

FIG. 7C is a simplified block diagram illustrating communication signal paths in a second antenna switching state of the communication device of FIG. 7A according to some embodiments of the present invention. FIG. 7C illustrates the connections between the transmit chains and the antennas in the second antenna switching state under the SRS UL antenna switching protocol. It can be seen that in the first antenna switching state, the first n78-band transmit chain 715-1 is coupled to the first n78/n79-band antenna 735-1, and the first n79-band transmit chain 725-1 is coupled to the first n78/n79-band antenna 735-1, the second n78-band transmit chain 715-2 is coupled to the second n78/n79-band antenna 735-2, and the second n79-band transmit chain 725-2 is coupled to the second n78/n79-band antenna 735-2. Again, since the receiver chains are not involved in the antenna switching, the connections of the receiver chains are shown in bold broken lines and are not described in detail here.

FIGS. 7D and 7E are tables listing the connections between the transmit and receive chains and the antennas in the first antenna switching state and the second antenna switching state according to some embodiments of the present invention. In FIG. 7D, the active n78 transmit chains and receive chains are shaded. In FIG. 7E, the active n79 transmit chains and receive chains are shaded.

As shown in FIG. 7D, in the first antenna switching state, the first first-band transmit chain n78 Tx0 is coupled to the first first-band antenna ANT-0, and the second first-band transmit chain n78 Tx1 is coupled to the second first-band antenna ANT-3. In the second antenna switching state, the first first-band transmit chain n78 Tx0 is coupled to the first dual-band antenna ANT-2, and the second first-band transmit chain n78 Tx1 is coupled to the second dual-band antenna ANT-4.

As shown in FIG. 7E, in the first antenna switching state, the first second-band transmit chain n79 Tx0 is coupled to the first second-band antenna ANT-1, and the second second-band transmit chain n79 Tx1 is coupled to the second second-band antenna ANT-5. In the second antenna switching state, the first second-band transmit chain n79 Tx0 is coupled to the first dual-band antenna ANT-2, and the second second-band transmit chain n79 Tx1 is coupled to the second second-band antenna ANT-4.

Figure 8:
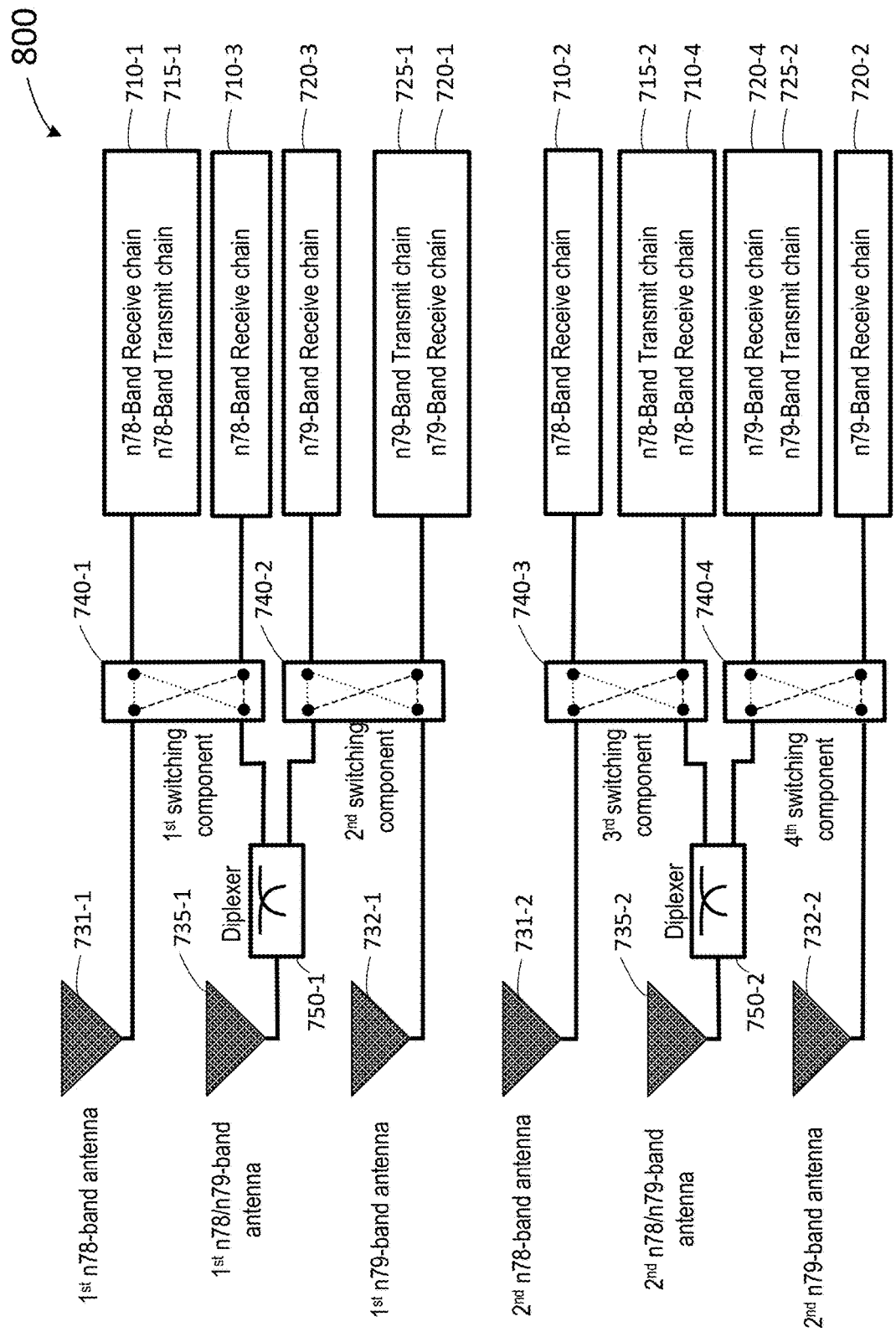
FIG. 8 is a simplified block diagram illustrating another example of the communication device of FIG. 7A according to some embodiments of the present invention.

FIG. 8 is a simplified block diagram illustrating another example of the communication device of FIG. 7A according to some embodiments of the present invention. As shown in FIG. 8, communication device 800 is similar to communication device 700 of FIG. 7A, with the exception that the second first-band (n78-band) transmit chain 715-2 shares a second pole of the third switch 740-3 with the fourth first-band (n78-band) receive chain 710-2, and the second second-band (n79-band) transmit chain 725-2 shares a second pole of the fourth switch 740-4 with the fourth second-band (n79-band) receive chain 720-4. The operation of communication device 800 is otherwise similar to the operation of communication device 700 of FIG. 7A as described above.

Figure 9:
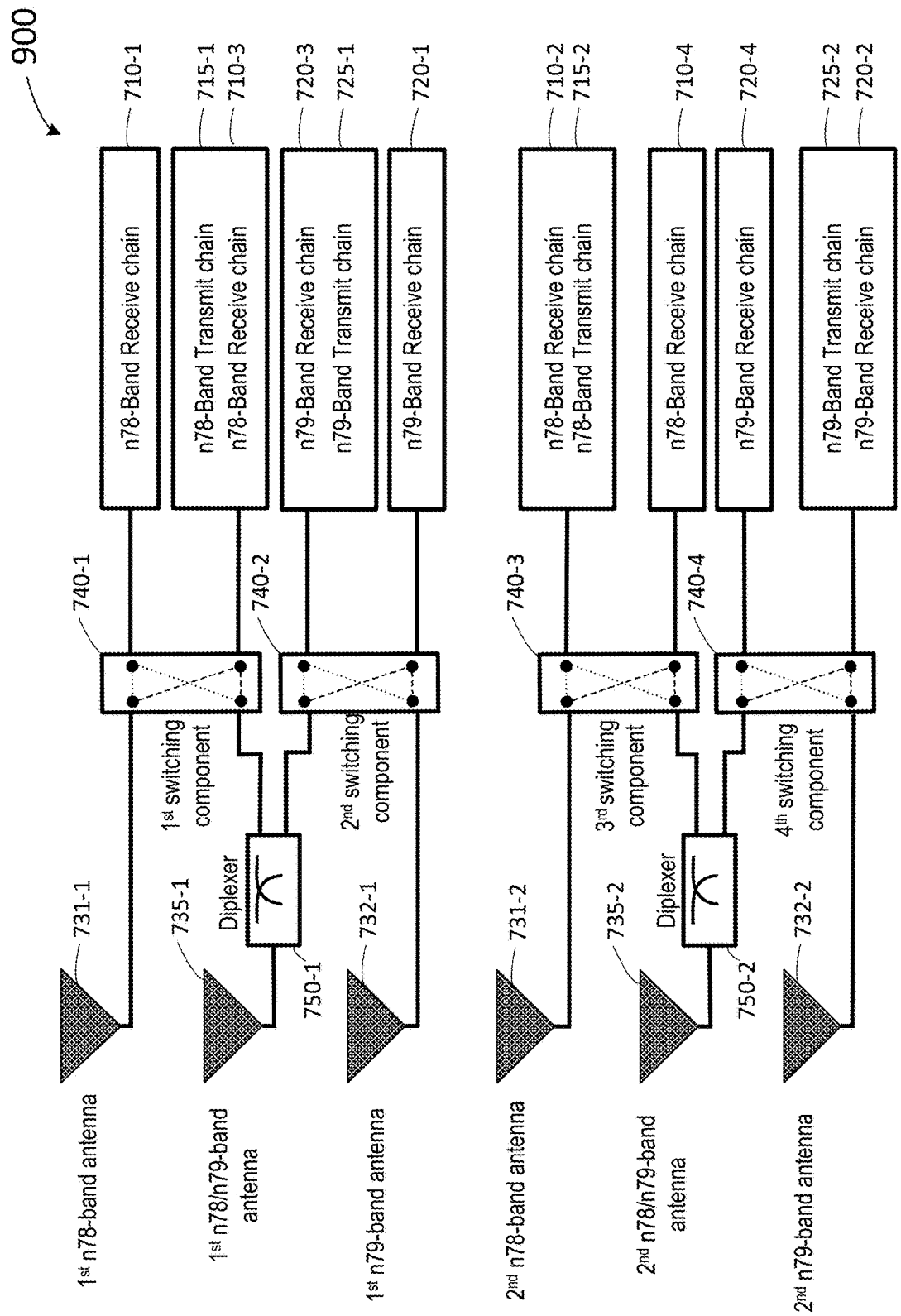
FIG. 9 is a simplified block diagram illustrating another example of the communication device of FIG. 7A according to some embodiments of the present invention.

FIG. 9 is a simplified block diagram illustrating another example of the communication device of FIG. 7A according to some embodiments of the present invention. As shown in FIG. 9, communication device 900 is similar to communication device 700 of FIG. 7A, with the exception that the first first-band (n78-band) transmit chain 715-1 shares a second pole of the first switch 740-1 with the third first-band (n78-band) receive chain 710-3, and the first second-band (n79-band) transmit chain 725-1 shares a second pole of the second switch 740-2 with the third second-band (n79-band) receive chain 720-3. The operation of communication device 900 is otherwise similar to the operation of communication device 700 of FIG. 7A as described above.

FIG. 10 is a simplified block diagram illustrating another example of the communication device of FIG. 7A according to some embodiments of the present invention. As shown in FIG. 10, communication device 1000 is similar to communication device 700 of FIG. 7A, with the exception that the first first-band (n78-band) transmit chain 715-1 shares a second pole of the first switch 740-1 with the third first-band (n78-band) receive chain 710-3, the first second-band (n79-band) transmit chain 725-1 shares a second pole of the second switch 740-2 with the third second-band (n79-band) receive chain 720-3, the second first-band (n78-band) transmit chain 715-2 shares a second pole of the third switch 740-3 with the fourth first-band (n78-band) receive chain 710-2, and the second second-band (n79-band) transmit chain 725-2 shares a second pole of the fourth switch 740-4 with the fourth second-band (n79-band) receive chain 720-4. The operation of communication device 1000 is otherwise similar to the operation of communication device 700 of FIG. 7A as described above.

Figure 11A:
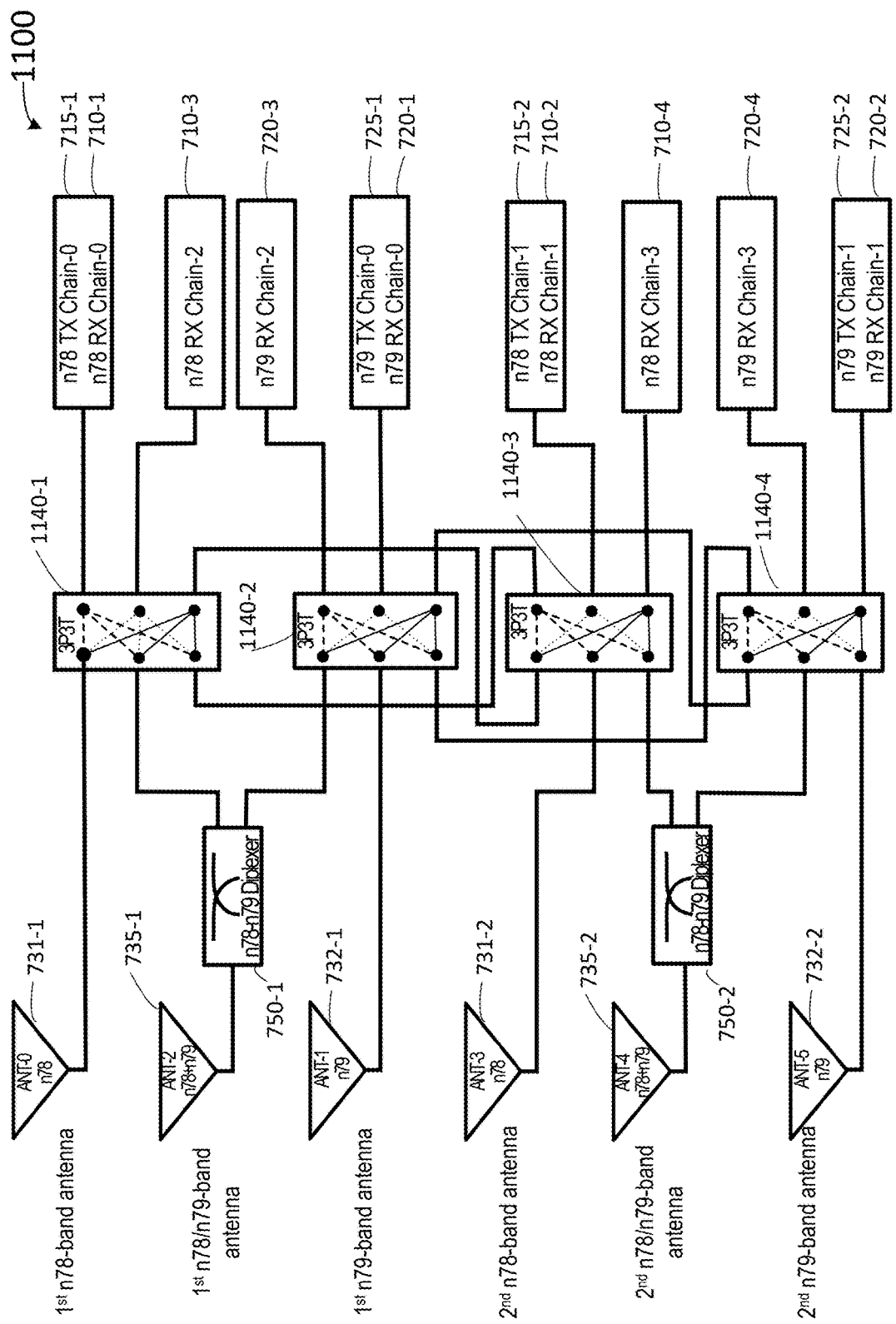
FIG. 11A is a simplified block diagram illustrating an example of another communication device according to some embodiments of the present invention.

FIG. 11A is a simplified block diagram illustrating an example of another communication device according to some embodiments of the present invention. FIG. 11A illustrates an example of 1T4R AND 2T4R (1T2R+1T2R) SRS Configuration —n78+n79 Bands DL CA with DL 4×4 MIMO on n78+n79 and UL 2×2 MIMO on n78/n79.

Similar to communication device 700 in FIG. 7A, communication device 1100 in FIG. 11A also includes eight receive chains (710-1, 710-2, 710-3, 710-4, 720-1, 720-2, 720-3, and 720-4), four transmit chains (715-1, 715-2, 725-1, and 725-2), six antennas (731-1, 731-2, 732-1, 732-2, 735-1, and 735-2), four switching components (1140-1, 1140-2, 1140-3, and 1140-4), and two diplexers (750-1 and 750-2). Further, the first frequency band is identified as the n78 band, and the second frequency band is identified as the n79 band. However, in the example of FIG. 11A, the four switching components (1140-1, 1140-2, 1140-3, and 1140-4) are implemented with triple-pole triple-throw (3P3T) switches. Each 3P3T switch is configured to couple two receive chains and a transmit chain to four alternative antennas. Further, the first frequency band is identified as the n78 band, and the second frequency band is identified as the n79 band.

In communication device 1100 of FIG. 11A, the first first-band (n78-band) receive chain 710-1 is switchably coupled to either the first first-band (n78-band) antenna 731-1 or the first dual-band antenna 735-1 through a first switch 1140-1. The third first-band (n78-band) receive chain 710-3 is switchably coupled to either the first dual-band (n78/n79-band) antenna 735-1 or the first first-band (n78-band) antenna 731-1 through the first switch 1140-1. The third second-band (n79-band) receive chain 720-3 is switchably coupled to either the first dual-band (n78/n79-band) antenna 735-1 or the first second-band (n79-band) antenna 732-1 through a second switch 1140-2. The first second-band (n79-band) receive chain 720-1 is switchably coupled to either the first second-band (n79-band) antenna 732-1 or the first dual-band (n78/n79-band) antenna 735-1 through the second switch 1140-2. The second first-band (n78-band) receive chain 710-2 is switchably coupled to either the second first-band (n78-band) antenna 731-2 or the second dual-band (n78/n79-band) antenna 735-2 through a third switch 1140-3. The fourth first-band (n78-band) receive chain 710-4 is switchably coupled to either the second dual-band (n78/n79-band) antenna 735-2 or the second first-band (n78-band) antenna 731-2 through the third switch 1140-3. The fourth second-band (n79-band) receive chain 720-4 is switchably coupled to either the second dual-band (n78/n79-band) antenna 735-2 or the second second-band (n79-band) antenna 732-2 through a fourth switch 1140-4. The second second-band (n79-band) receive chain 720-2 is switchably coupled to either the second second-band (n79-band) antenna 732-2 or the second dual-band (n78/n79-band) antenna 735-2 through the fourth switch 1140-4.

In FIG. 11A, the first first-band (n78-band) transmit chain 715-1 shares a first pole of the first switch 1140-1 with the first first-band (n78-band) receive chain 710-1, and is switchably coupled to either the first first-band (n78-band) antenna 731-1 or the first dual-band antenna 735-1 through a first switch 1140-1. In some embodiments, the sharing of a single pole of the switch can be implemented through an additional single-pole double-throw (SPDT) switch. Similarly, the first second-band (n79-band) transmit chain 725-1 shares a first pole of the second switch 1140-2 with the first second-band (n79-band) receive chain 720-1. The second first-band (n78-band) transmit chain 715-2 shares a second pole of the third switch 1140-3 with the second first-band (n78-band) receive chain 710-2. The second second-band (n79-band) transmit chain 725-2 shares a third pole of the fourth switch 1140-4 with the second second-band (n79-band) receive chain 720-2.

Figure 11B:
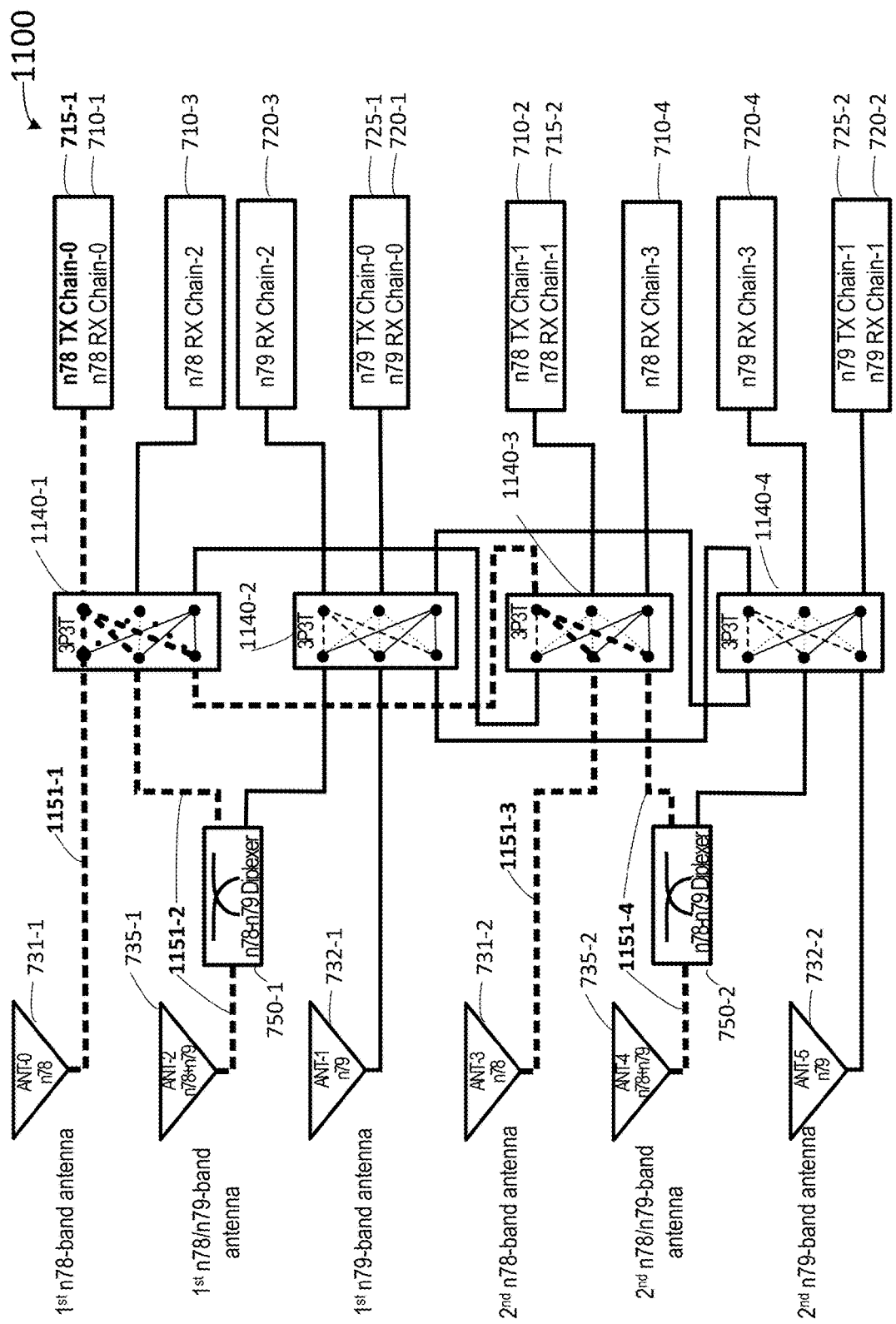
FIG. 11B is a simplified block diagram illustrating an example of antenna switching communication signal paths for a transmit chain in the communication device of FIG. 11A according to some embodiments of the present invention.

In FIG. 11A, each of the 3P3T switches 1140 provides 1T2R switching of the n78 or n79 TX chain attached to that switch. Additionally, a path is provided between the n78 3P3T switches and the n79 3P3T switches allowing the switches to support 1T4R switching of n78 or n79 TX chains. In FIG. 11A, the 3P3T switches allow each transmit chain to switch among four antennas for SRS UL 1T4R antenna switching. As shown in FIG. 11A, the first switch 1140-1 is coupled to the third switch 1140-3, and the second switch 1140-2 is coupled to the fourth switch 1140-4. FIG. 11B illustrates an example of the four possible signal paths for a transmit chain.

FIG. 11B is a simplified block diagram illustrating an example of antenna switching communication signal paths for a transmit chain in the communication device of FIG. 11A according to some embodiments of the present invention. As shown by the bold broken lines in FIG. 11B, the first n78-band transmit chain 715-1 (n78 TX Chan-0) can be connected to one of four antennas based on the instruction from the base station. In the first signal path 1151-1, n78 transmit chain 715-1 is coupled to the first n78-band antenna 731-1 through the first switch 1140-1. In the second signal path 1151-2, n78 transmit chain 715-1 is coupled to the first n78/n79-band antenna 735-1 through the first switch 1140-1 and the first diplexer 750-1. In the third signal path 1151-3, n78 transmit chain 715-1 is coupled to the second n78-band antenna 731-2 through the first switch 1140-1 and the third switch 1150-3. In the fourth signal path 1151-4, n78 transmit chain 715-1 is coupled to the second n78/n79-band antenna 735-2 through the first switch 1140-1, the third switch 1150-3, and the second diplexer 750-2. Similarly, it can be shown from FIG. 11A that each of the second n78-band transmit chain 715-2, the first n79-band transmit chain 725-1, and the second n79-band transmit chain 725-2 can be connected to one of four antennas based on the instruction from the base station.

As described above, FIG. 11A illustrates an example of 2T4R (1T2R+1T2R) and 1T4R configuration in n78+n79 Bands DL CA with DL 4×4 MIMO on n78+n79 and UL 2×2 MIMO n78/n79 with SRS antenna switching. This embodiment can reduce insertion loss by use of two pair of 3P3 Ts (e.g., instead of arrangements that might use 2×4P4T switches in cascade with other switches). The arrangement of diplexers and 3P3T enables reduction of required number of antennas. The use of two pairs of 3P3 Ts provides for layout flexibility and ease in locating RF front end components near their respective antennas and hence improving link budget of the device, for better total radiated power (TRP) and total isotropic sensitivity performance (TIS).

Figure 12:
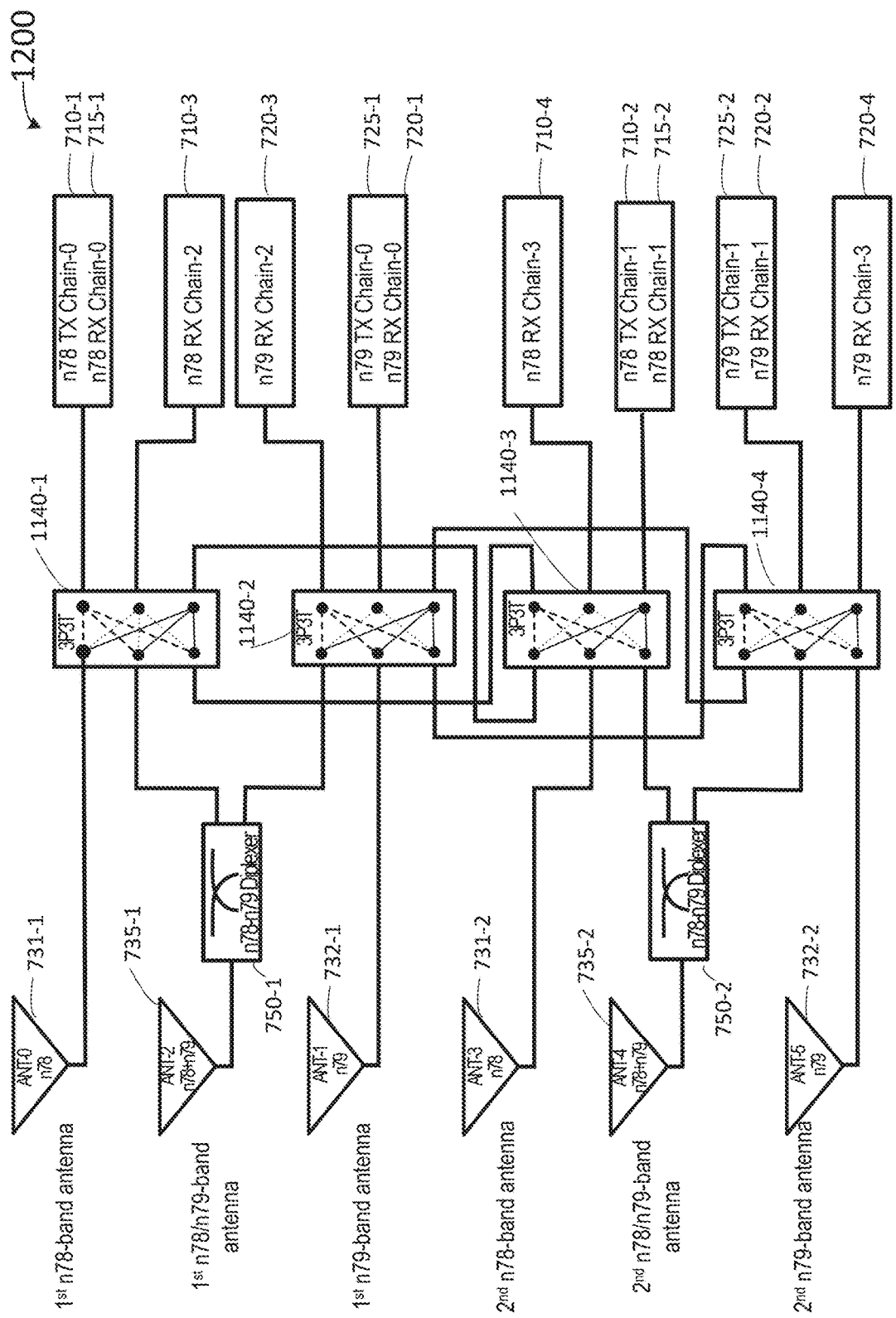
FIG. 12 is a simplified block diagram illustrating another example of the communication device of FIG. 11 according to some embodiments of the present invention.

FIG. 12 is a simplified block diagram illustrating another example of the communication device of FIG. 11A according to some embodiments of the present invention. As shown in FIG. 12, communication device 1200 is similar to communication device 1100 of FIG. 11A, with the exception that the second first-band (n78-band) transmit chain 715-2 shares a third pole of the third switch 1140-3 with the second first-band (n78-band) receive chain 710-2, and the second second-band (n79-band) transmit chain 725-2 shares a second pole of the fourth switch 1140-4 with the second second-band (n79-band) receive chain 720-2. The operation of communication device 1200 is otherwise similar to the operation of communication device 1100 of FIG. 11A as described above.

Figure 13:
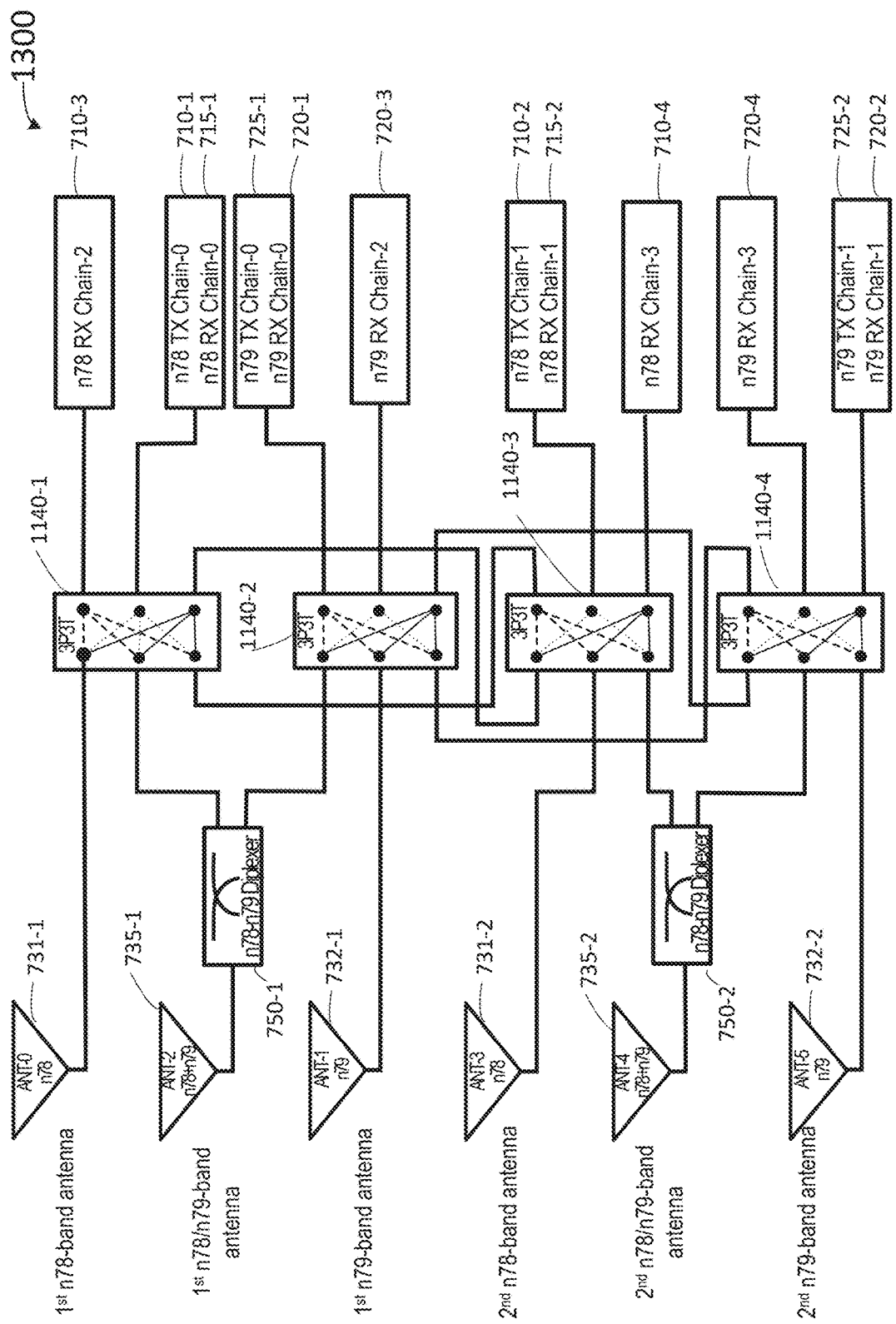
FIG. 13 is a simplified block diagram illustrating another example of the communication device of FIG. 11 according to some embodiments of the present invention.

FIG. 13 is a simplified block diagram illustrating another example of the communication device of FIG. 11A according to some embodiments of the present invention. As shown in FIG. 13, communication device 1300 is similar to communication device 1100 of FIG. 11A, with the exception that the first first-band (n78-band) transmit chain 715-1 shares a second pole of the first switch 1140-1 with the first first-band (n78-band) receive chain 710-1, and the first second-band (n79-band) transmit chain 725-1 shares a first pole of the second switch 1140-2 with the first second-band (n79-band) receive chain 720-1. The operation of communication device 1300 is otherwise similar to the operation of communication device 1100 of FIG. 11A as described above.

Figure 14:
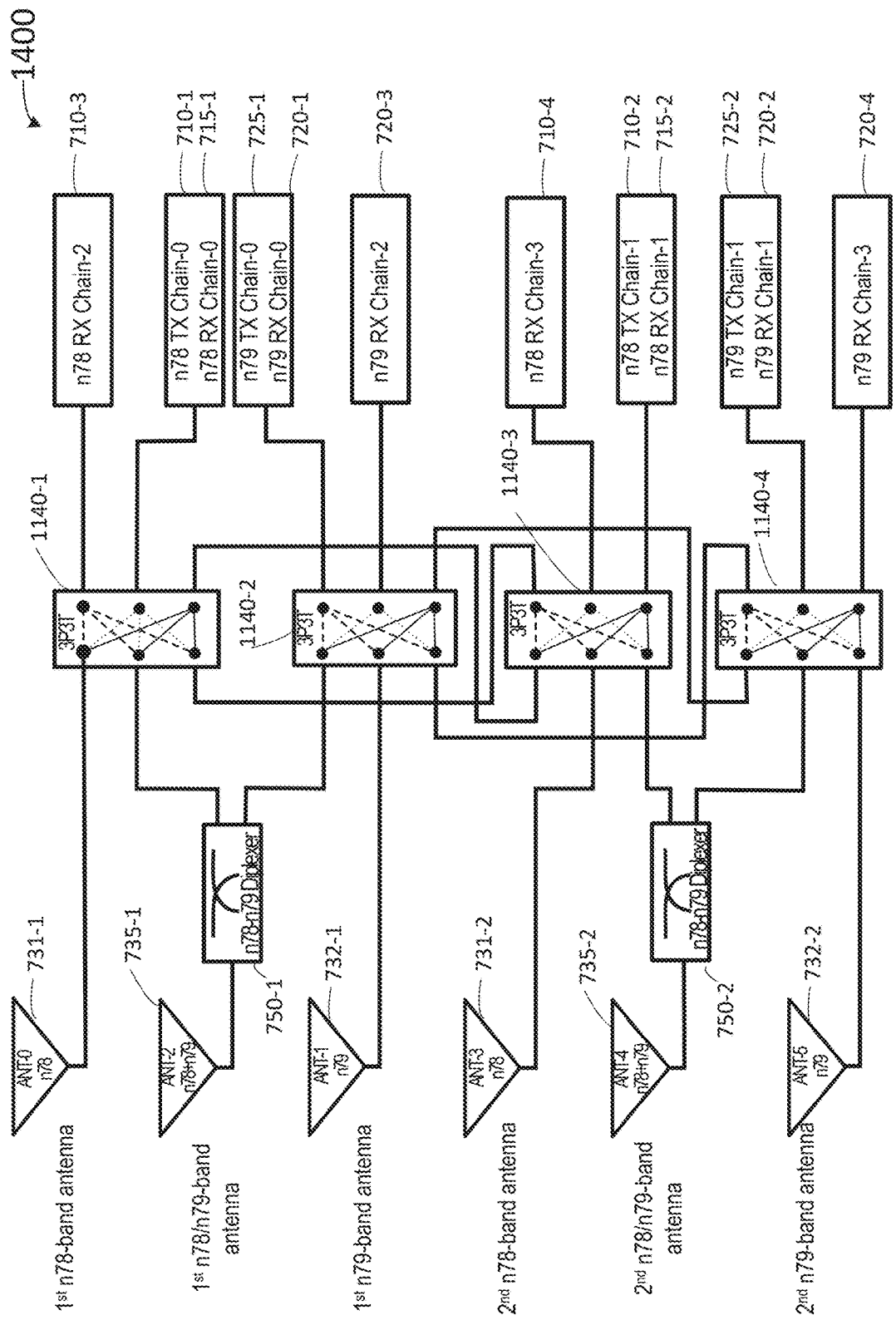
FIG. 14 is a simplified block diagram illustrating another example of the communication device of FIG. 11 according to some embodiments of the present invention.

FIG. 14 is a simplified block diagram illustrating another example of the communication device of FIG. 11A according to some embodiments of the present invention. As shown in FIG. 14, communication device 1400 is similar to communication device 1100 of FIG. 11A, with the exception that the first first-band (n78-band) transmit chain 715-1 shares a second pole of the first switch 1140-1 with the first first-band (n78-band) receive chain 710-1, the first second-band (n79-band) transmit chain 725-1 shares a first pole of the second switch 1140-2 with the first second-band (n79-band) receive chain 720-1, the second first-band (n78-band) transmit chain 715-2 shares a third pole of the third switch 1140-3 with the second first-band (n78-band) receive chain 710-2, and the second second-band (n79-band) transmit chain 725-2 shares a second pole of the fourth switch 1140-4 with the second second-band (n79-band) receive chain 720-2. The operation of communication device 1400 is otherwise similar to the operation of communication device 1100 of FIG. 11A as described above.

Figure 15:
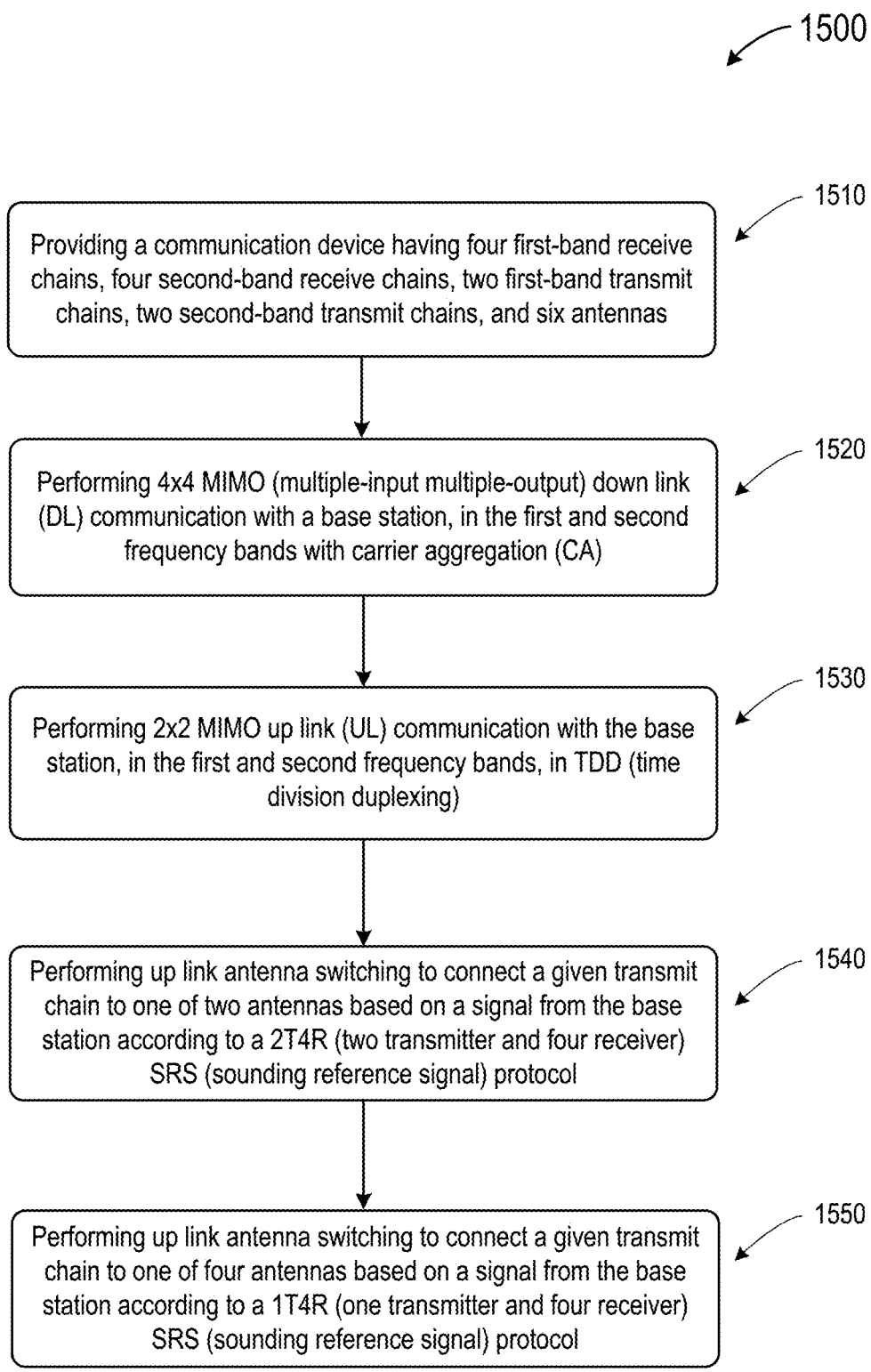
FIG. 15 is a simplified flowchart illustrating a method for operating a communication device according to some embodiments of the present invention.

FIG. 15 is a simplified flowchart illustrating a method for operating a communication device according to some embodiments of the present invention. The method enables a communication device, such as a user equipment, to perform MIMO communication with a base station in multiple frequency bands using a limited number of antennas. The embodiments described herein relate to a switching scheme for a six antenna approach. However, this scheme can also be adapted to any suitable situation involving the use of shared antennas for n78 and n79 or other suitable frequency bands.

Embodiments support simultaneous operation of n78 and n79 bands (DL CA), while also supporting DL 4×4 MIMO (e.g., FIG. 2 FIG. 3) and 2T4R/1T4R (e.g., FIGS. 3A and 3B FIG. 5, FIG. 4) for each of these bands. Embodiments provide for a novel antenna architecture, with novel form factor and mechanical/thermal design constraints, which in some examples, includes six antennas that can support n78 and n79 (2 dedicated n78 band antennas, two dedicated n79 band antennas and two shared n78+n79 band antennas). Some of these antennas can also be shared with other antennas (other cellular bands, GNSS, WLAN, BT, etc.).

This antenna architecture may lead to a switching scheme which enables support of DL 4×4 MIMO+2×2 UL MIMO+2T4R/1T4R SRS capabilities while allowing for DL CA of n78 and n79 bands. The scheme, presented in this disclosure, minimizes insertion loss (and hence TX and RX lineup path loss), provides flexibility of routing to different antennas, and allows the use of shared antennas for n78 and n79.

From an RF and antenna architecture perspective, to support DL 4×4 MIMO+2×2 UL MIMO+2T4R/1T4R SRS, while also allowing for DL CA of n78 and n79 bands, connections are provided for simultaneously connecting four antennas to n78 TX/RX chains and four antennas to n79 TX/RX chains.

There can be many permutations in which the above functions can be implemented. For example, the following can be implemented: eight antennas (four dedicated n78, four dedicated n79); seven antennas (three dedicated n78, three dedicated n79, one shared n78+n79); six antennas (two dedicated n78, two dedicated n79, two shared n78+n79); five antennas (one dedicated n78, one dedicated n79, three shared n78+n79); or four antennas (four shared n78+n79).

These configurations are independent of the total number of antennas in the system which likely would include many other cellular and WLAN bands, and the above examples merely identify how many antennas in the system would have to be capable of operating in n78 and n79 bands. Some of these antennas could be shared with cellular bands, some could be shared with WLAN bands and yet some might be dedicated to either n78 band or n79 band or both.

As shown in the flowchart in FIG. 15, method 1500 for wireless communication can be summarized as follows.

1510: providing a communication device having four first-band receive chains, four second-band receive chains, two first-band transmit chains, two second-band transmit chains, and six antennas;

1520: performing 4×4 MIMO (multiple-input multiple-output) down link (DL) communication with a base station, in the first and second frequency bands with carrier aggregation (CA);

1530: performing 2×2 MIMO up link (UL) communication with the base station, in the first and second frequency bands, in TDD (time division duplexing);

1540: performing up link antenna switching to connect a given transmit chain to one of two antennas based on a signal from the base station; and

1550: performing up link antenna switching to connect a given transmit chain to one of four antennas based on a signal from the base station according to a 1T4R (one transmitter and four receiver) SRS (sounding reference signal) protocol.

Each of the above processes is further described below with reference to FIGS. 1-14. At 1510, the method includes providing a communication device having four first-band receive chains, four second-band receive chains, two first-band transmit chains, two second-band transmit chains, and six antennas. Examples of the communication device are described above in connection with FIGS. 4-14. In the examples of FIGS. 4-14, the communication device has six antennas including two first-band antennas, two second-band antennas, and two dual-band antennas, the two dual-band antennas configured to operate in the first-band and the second-band.

At 1520, the method includes performing 4×4 MIMO (multiple-input multiple-output) down link (DL) communication with a base station, in the first and second frequency bands with carrier aggregation (CA). For example, in communication devices 700 of FIG. 7A and communication device 1100 in FIG. 11A, there are four first-band receiver chains, four second-band receiver chains that can provide 4×4 MIMO (multiple-input multiple-output) down link (DL) communication with a base station, in the n78 and n79 bands with carrier aggregation (CA).

At 1530, the method includes performing 2×2 MIMO up link (UL) communication with the base station, in either the first frequency band or the second frequency band, in TDD (time division duplexing). For example, in communication devices 700 of FIG. 7A and communication device 1100 in FIG. 11A, there are two first-band transmit chains and two second-band transmit chains that can provide 2×2 MIMO up link (UL) communication with the base station, in the n78 and n79 bands.

At 1540, the method includes performing up link antenna switching to connect a given transmit chain to one of two antennas based on a signal from the base station. For example, in communication devices 700 of FIG. 7A, the transmit chains and the receiver chains are coupled to the antennas using four 2P2T switches and two diplexers. The antenna switching is performed according to a 2T4R (two transmitter and four receiver) SRS (sounding reference signal) protocol.

At 1550, the method includes performing up link antenna switching to connect a given transmit chain to one of four antennas based on a signal from the base station according to a 1T4R (one transmitter and four receiver) SRS (sounding reference signal) protocol. For example, in communication devices 1100 of FIG. 11A, the transmit chains and the receiver chains are coupled to the antennas using four 3P3T switches and two diplexers. The antenna switching is performed according to a 1T4R (one transmitter and four receiver) SRS (sounding reference signal) protocol.

As described above, in some embodiments, two pairs of DPDT switches are used along with n78-n79 diplexers and arrange the ports to support 2T4R SRS. This approach permits use of antenna sharing between n78 and n79 which helps reduce the total number of antennas in the device, while minimizing the amount of switching on a path. The arrangement also provides for reduced insertion loss and provides simplified and flexible routing of RF paths, when compared to use of 2× 4P4T switches. Use of two pairs of DPDT switches helps in locating RF front end components near their respective antennas, hence improving link budget of the device.

In some embodiments, the concept is extended to provide 1T4R support in addition to 2T4R support. In this scheme, the idea is to use two pairs of 3P3T switches along with n78-n79 diplexers and arrange the ports to support both 2T4R and 1T4R SRS. This approach also permits use of antenna sharing between n78 and n79, which helps reduce the total number of antennas in the device, while minimizing the amount of switching on a path and reduced insertion loss compared to cascaded switches and/or using 4P4T switches. Use of two pairs of 3P3T switches helps in locating RF front end components near their respective antennas and hence improving link budget of the device.

It should be appreciated that the specific steps illustrated in FIG. 15 provide a particular method of operating a communication device according to an embodiment of the present invention. Other sequences of steps may also be performed according to alternative embodiments. For example, alternative embodiments of the present invention may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize many variations, modifications, and alternatives.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A multiple-input, multiple-output (MIMO) transceiver, comprising:
    a plurality of RF chains;
    a plurality of antennas;
    a plurality of switching components; and
    a control circuitry operatively coupled to the plurality of switching components;
    wherein a total quantity of RF chains included in the plurality of RF chains is equal to a first value, and a total quantity of antennas included in the plurality of antennas is equal to a second value that is less than the first value;
    wherein the plurality of RF chains comprises:
        a first plurality of RF chains comprising electronics configured to support communication on a first RF band; and
        a second plurality of RF chains comprising electronics configured to support communication on a second RF band; and
    wherein the plurality of antennas comprises:
        a first antenna configured to communicate on the first RF band;
        a second antenna configured to communicate on a second RF band different from the first RF band; and
        a third antenna configured to communicate on the first and second RF bands;
    wherein the plurality of switching components comprises a first switching component electrically coupled to two of the first plurality of RF chains, the first antenna, and the third antenna; and wherein the plurality of switching components further comprises a second switching component electrically coupled to two of the second plurality of RF chains, the second antenna, and the third antenna.

2. The MIMO transceiver of claim 1, wherein the control circuitry is configured to:
selectively cause the first switching component to toggle between
(i) a state in which a first one of the first plurality of RF chains is electrically coupled to the first antenna and a second one of the plurality of the RF chains is electrically coupled to the third antenna; and
(ii) a state in which the first one of the first plurality of the RF chains is electrically coupled to the third antenna and the second one of the first plurality of RF chains is electrically coupled to the first antenna; and
selectively cause the second switching component to toggle between:
(i) a state in which a first one of the second plurality of RF chains is electrically coupled to the second antenna and a second one of the second plurality of RF chains is electrically coupled to the third antenna; and
(ii) a state in which the first one of the second plurality of RF chains is electrically coupled to the third antenna and the second one of the second plurality of RF chains is electrically coupled to the second antenna.

3. The MIMO transceiver of claim 2, wherein the transceiver is configured to communicate with a base station;
wherein the transceiver is configured to selectively cause one or both of the first and second switching components to toggle from states in response to receiving a command to do so from the base station;
wherein the transceiver is configured to communicate with the base station in accordance with a time division duplexing (TDD) protocol; and
wherein the transceiver is configured to communicate with the base station in accordance with a time division duplexing (TDD) protocol.

4. The MIMO transceiver of claim 3, wherein the transceiver further comprises a diplexer, and the first and second switching components are electrically coupled to the third antenna by way of the diplexer; and
wherein each switching component in the plurality of switching components is a double-pole double-throw switch.

5. The MIMO transceiver of claim 1, wherein the plurality of antennas further includes:
a fourth antenna configured to communicate on the first RF band;
a fifth antenna configured to communicate on the second RF band; and
a sixth antenna configured to communicate on the first and second RF bands.

6. The MIMO transceiver of claim 5, wherein the plurality of switching components further includes:
a third switching component electrically coupled to two of the first plurality of RF chains, the fourth antenna, and the sixth antenna;
a fourth switching component electrically coupled to two of the second plurality of RF chains, the fifth antenna, and the sixth antenna; and
a diplexer, wherein the third and fourth switching components are electrically coupled to the sixth antenna by way of the diplexer.

7. The MIMO transceiver of claim 6, wherein the control circuitry is further configured to:

selectively cause the third switching component to toggle between:
(i) a state in which a third one of the first plurality of RF chains is electrically coupled to the fourth antenna and a fourth one of the first plurality of RF chains is electrically coupled to the sixth antenna; and
(ii) a state in which the third one of the first plurality of RF chains is electrically coupled to the sixth antenna and the fourth one of the first plurality of RF chains is electrically coupled to the fourth antenna; and
selectively cause the fourth switching component to toggle between:
(i) a state in which a third one of the second plurality of RF chains is electrically coupled to the fifth antenna and a fourth one of the second plurality of RF chains is electrically coupled to the sixth antenna; and
(ii) a state in which the third one of the second plurality of RF chains is electrically coupled to the sixth antenna and the fourth one of the second plurality of RF chains is electrically coupled to the fifth antenna.

8. The MIMO transceiver of claim 7, wherein:
each switching component in the plurality of switching components is a triple-pole triple-throw (3P3T) switch;
the first switching component is electrically coupled to the third switching component; and
the second switching component is electrically coupled to the fourth switching component.

9. A wearable device comprising the MIMO transceiver of claim 1.

10. A communication device, comprising six antennas, eight receive chains, and four transmit chains;
wherein the six antennas comprise:
two first-band antennas, including a first first-band antenna and a second first-band antenna, configured for communication in a first frequency band;
two second-band antennas, including a first second-band antenna and a second second-band antenna, configured for communication in a second frequency band; and
two dual-band antennas, including a first dual-band antenna and a second dual-band antenna, configured for communication in both the first frequency band and second frequency band;
wherein the eight receive chains comprise:
four first-band receive chains, including first, second, third, and fourth first-band receive chains, configured for receiving signals in the first frequency band, each one of the four first-band receive chains being switchably coupled to a respective one of the two first-band antennas and the two dual-band antennas; and
four second band receive chains, including first, second, third, and fourth second-band receive chains, configured for receiving signals in the second frequency band, each one of the four second-band receive chains being switchably coupled to a respective one of the two second-band antennas and the two dual-band antennas;
wherein the four transmit chains comprise:
two first-band transmit chains, including a first first-band transmit chain and a second first-band transmit chain, configured for transmitting signals in the first frequency band, each one of the two first-band transmit chains being switchably coupled to one of the two first-band antennas or a first one of the two dual-band antennas; and
two second-band transmit chains, including a first second-band transmit chain and a second second-band transmit chain, configured for transmitting signals in the second frequency band, each one of the two second-band transmit chains being switchably coupled to one of the two second-band antennas or a second one of the two dual-band antennas.

11. The communication device of claim 10, wherein:
each of the first first-band receive chain, the first first-band transmit chain, and the third first-band receive chain is switchably coupled to either the first first-band antenna or the first dual-band antenna through a first switch;
each of the third second-band receive chain, the first second-band transmit chain, and the first second-band receive chain is switchably coupled to either the first dual-band antenna or the first second-band antenna through a second switch;
each of the second first-band receive chain, the second first-band transmit chain, and the fourth first-band receive chain is switchably coupled to either the second first-band antenna or the second dual-band antenna through a third switch; and
each of the fourth second-band receive chain, the first second-band transmit chain, and the second second-band receive chain is switchably coupled to either the second dual-band antenna or the second second-band antenna through a fourth switch;
wherein the communication device further comprises a first diplexer and a second diplexer, wherein:
the first diplexer couples the first dual-band antenna to the first switch and the second switch; and
the second diplexer couples the second dual-band antenna to the third switch and the fourth switch.

12. The communication device of claim 11, wherein each of the first switch, the second switch, the third switch, and the fourth switch is a DPDT (double-pole double-throw, or 2P2T)) switch;
wherein the four first-band receive chains and the four second-band receive chains are configured to perform 4×4 MIMO (multiple-input multiple-output) down link (DL) communication, with carrier aggregation (CA) in the first and second frequency bands, with a base station; and
wherein the two first-band transmit chains and the two second-band transmit chains are configured to perform 2×2 MIMO up link (UL) communication, in the first and second frequency bands, respectively, in TDD (time division duplexing) with a base station with UL antenna switching according to 1T2R SRS (sounding reference signal) protocol.

13. The communication device of claim 11, wherein:
each of the first switch, the second switch, the third switch, and the fourth switch is a 3P3T (triple-pole triple-throw) switch;
the first switch is coupled to the third switch;
the second switch is coupled to the fourth switch;
each one of the two first-band transmit chains is switchably coupled to any one of the two first-band antennas and the two dual-band antennas; and
each one of the two second-band transmit chains is switchably coupled to any one of the two second-band antennas and the two dual-band antennas.

14. The communication device of claim 13, wherein the two first-band transmit chains and the two second-band transmit chains are configured to perform 2×2 MIMO up link (UL) communication, in the first and second frequency bands, respectively, in TDD (time division duplexing) with a base station with UL antenna switching according to 1T4R SRS (sounding reference signal) protocol.

15. A method for wireless communication, the method comprising:
providing a communication device having four first-band receive chains, four second-band receive chains, two first-band transmit chains, two second-band transmit chains, and six antennas, wherein the six antennas comprise two first-band antennas, two second-band antennas, and two dual-band antennas, the two dual-band antennas being configured to operate in the first-band and the second-band;
performing 4×4 MIMO (multiple-input multiple-output) down link (DL) communication with a base station, in the first and second frequency bands with carrier aggregation (CA);
performing 2×2 MIMO up link (UL) communication with the base station, in the first and second frequency bands, in TDD (time division duplexing);
coupling the transmit chains and the receive chains to the antennas using four 2P2T switches and two diplexers; and
performing up link antenna switching to connect a given transmit chain to one of two antennas based on a signal from the base station according to a 2T4R (two transmitter and four receiver) SRS (sounding reference signal) protocol.

* * * * *